US010839988B2

(12) United States Patent
Takada et al.

(10) Patent No.: US 10,839,988 B2
(45) Date of Patent: Nov. 17, 2020

(54) WIRE HARNESS MANUFACTURING SYSTEM AND WIRE HARNESS MANUFACTURING METHOD

(71) Applicant: YAZAKI CORPORATION, Tokyo (JP)

(72) Inventors: Kazuhiko Takada, Shizuoka (JP); Takuya Taniguchi, Shizuoka (JP); Hajime Nagano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 254 days.

(21) Appl. No.: 16/174,179

(22) Filed: Oct. 29, 2018

(65) Prior Publication Data

US 2019/0066880 A1 Feb. 28, 2019

Related U.S. Application Data

(63) Continuation of application No. PCT/JP2017/017002, filed on Apr. 28, 2017.

(30) Foreign Application Priority Data

May 31, 2016 (JP) ................................ 2016-109040

(51) Int. Cl.
*H01R 43/00* (2006.01)
*H01B 13/012* (2006.01)
(Continued)

(52) U.S. Cl.
CPC ....... *H01B 13/01209* (2013.01); *H01R 43/20* (2013.01); *H01B 13/01263* (2013.01);
(Continued)

(58) Field of Classification Search
CPC ........ H01B 13/01209; H01B 13/01263; H01R 43/20; H01R 43/055; H01R 43/048; H01R 43/0207; Y10T 29/49174; Y10T 29/53209
(Continued)

(56) References Cited

U.S. PATENT DOCUMENTS 5,385,434 A * 1/1995 Quinn .................. B23P 19/003
198/399
5,406,692 A * 4/1995 Oishi ..................... B21D 7/024
29/753
(Continued)

FOREIGN PATENT DOCUMENTS

CN 202758535 U 2/2013
CN 103192257 A 7/2013
(Continued)

OTHER PUBLICATIONS

Chinese Office Action for the related Chinese Patent Application No. 201780026868.0 dated Jun. 4, 2019.
(Continued)

*Primary Examiner* — Donghai D Nguyen
(74) *Attorney, Agent, or Firm* — Kenealy Vaidya LLP

(57) ABSTRACT

A wire harness manufacturing system includes an assembly line that manufactures a wire harness and one or a plurality of supply devices that prepares to supply component magazines in which components of the wire harness are loaded in a holder to the assembly line. Each of the supply devices is capable of preparing a plurality of the component magazines which are different according to types of the components. The component magazines are capable of delivering from the supply devices to at least a part of the series of assembly steps in a state of being independent of both the assembly line and the supply device.

5 Claims, 14 Drawing Sheets

(51) Int. Cl.

| | |
|---|---|
| ***H01R 43/20*** | (2006.01) |
| *H01R 43/05* | (2006.01) |
| *H01R 43/055* | (2006.01) |
| *H01R 13/52* | (2006.01) |
| *H01B 13/06* | (2006.01) |
| *H01R 4/18* | (2006.01) |
| *H01R 43/048* | (2006.01) |

(52) U.S. Cl.
CPC ............ *H01B 13/062* (2013.01); *H01R 4/185* (2013.01); *H01R 13/5205* (2013.01); *H01R 43/005* (2013.01); *H01R 43/048* (2013.01); *H01R 43/05* (2013.01); *H01R 43/055* (2013.01); *Y10T 29/53209* (2015.01)

(58) Field of Classification Search
USPC ........................................... 29/857, 861, 747
See application file for complete search history.

(56) References Cited

U.S. PATENT DOCUMENTS

| | | | | |
|---|---|---|---|---|
| 5,737,835 | A * | 4/1998 | Murata | H01R 43/0207 29/863 |
| 6,128,810 | A | 10/2000 | Suzuki et al. | |
| 10,050,401 | B2 * | 8/2018 | Katou | G01B 11/2433 |
| 2006/0196153 | A1 | 9/2006 | Ishigure | |
| 2010/0031613 | A1 | 2/2010 | Ishigure | |
| 2013/0175138 | A1 | 7/2013 | Hoell et al. | |
| 2014/0317921 | A1 | 10/2014 | Yamamoto et al. | |

FOREIGN PATENT DOCUMENTS

| | | | |
|---|---|---|---|
| CN | 104067356 | A | 9/2014 |
| JP | 9-115640 | A | 5/1997 |
| JP | 10-208844 | A | 8/1998 |
| JP | 2005-78913 | A | 3/2005 |
| JP | 2009-173448 | A | 8/2009 |
| JP | 2015-76198 | A | 4/2015 |

OTHER PUBLICATIONS

International Search Report and Written Opinion of the International Search Report for PCT/JP2017/017002 dated Jun. 13, 2017.
Japanese Office Action for the related Japanese Patent Application No. 2016-109040 dated Jun. 19, 2018.
Written Opinion of the International Search Report for PCT/JP2017/017002 dated Jun. 13, 2017.

* cited by examiner

WIRE HARNESS MANUFACTURING SYSTEM AND WIRE HARNESS MANUFACTURING METHOD

CROSS REFERENCE TO RELATED APPLICATIONS

This application is a continuation of PCT application No. PCT/JP2017/017002, which was filed on Apr. 28, 2017 based on Japanese Patent Application (No. 2016-109040) filed on May 31, 2016, the contents of which are incorporated herein by reference.

BACKGROUND OF THE INVENTION

Field of the Invention

The present invention relates to a wire harness manufacturing system including an assembly line that manufactures a wire harness through a series of assembly steps and supply devices that prepare to supply components of the wire harness to the assembly line, and a wire harness manufacturing method.

Description of Related Art

A wire harness used in an automobile and the like is manufactured by cutting an electrical wire into a predetermined length, crimping a terminal to an end thereof, forming a sub-harness through insertion of the terminal into a connector, bundling of a plurality of electrical wire-attached connectors, and attachment of a waterproof grommet, a protector, and the like, and assembling a plurality of sub-harnesses collectively. Such a series of assembly steps are generally performed on an assembly line.

In a manufacturing system, for example, a waterproof rubber plug (hereinafter, referred to as “waterproof plug”) that is a component of a wire harness is provided to an assembly line (directly connected to the assembly line) by a supply device (so-called hopper), in which the supply device aligns the waterproof plug in a predetermined direction and supplies the waterproof plug to the assembly line. In the supply device, the waterproof plug is filled in a funnel-shaped nozzle and drawn out from the nozzle by suction, and is thus supplied to the assembly line one by one with the orientation thereof adjusted (for example, see Patent Document 1: JP-A-2009-173448).

[Patent Document 1] JP-A-2009-173448

According to a related art, in a supply device of a system that supplies a waterproof plug, a waterproof plug located at a deepest portion of a funnel-shaped nozzle (closest to a discharge opening of the nozzle) is sucked and taken out. More specifically, the waterproof plug has an orientation thereof adjusted along an axial direction of a pipe-shaped passage (pipeline) when passing through the passage through the discharge opening of the funnel-shaped nozzle. That is, the supply device merely has a function of taking out the waterproof plug located in vicinity of the discharge opening of the nozzle sequentially, and does not have a function of distinguishing a type (for example, various product Nos. different in size of diameter and length of the waterproof plug) of the waterproof plug before taking it out.

As a result, in the system, the type of the waterproof plug and that of the supply device correspond respectively. In other words, it is necessary to prepare a plurality of supply devices at the number of types (product Nos.) of a plurality of waterproof plugs to distinguish and deal these types (product Nos.).

Meanwhile, a wire harness typically has different structures for each type of vehicle, and has different structures even for the same type of vehicle according to grade, optional equipment, and the like. That is, a wire harness has various structures due to properties thereof. For example, various types (product Nos.) of waterproof plugs are used for wire harnesses of each specification.

However, it is not practical to provide a plurality of different (different for wire harnesses of each specification) assembly lines for each of wire harnesses having different structures in terms of cost and the like when the wire harnesses are actually manufactured. Therefore, it is typically required to manufacture different types of wire harnesses on a single assembly line.

As a result of such a requirement, for example, a plurality of supply devices different for each type of waterproof plug (different for waterproof plugs of each product No.) may be provided to a single assembly line. However, in this case, not only installation cost of the supply devices increases but also operation timings and the like of the plurality of supply devices need to be reset for wire harnesses of each specification, and preparation cost of the manufacturing system (and eventually manufacturing cost of the wire harnesses) is accordingly increased.

Additionally, the disadvantage associated with using a plurality of supply devices different for such each type (product No.) is not necessarily limited to supply of the waterproof plug, and may also occur to supply of components of a wire harness other than the waterproof plug.

SUMMARY

One or more embodiments provide a wire harness manufacturing system and a wire harness manufacturing method, in which manufacturing cost of a wire harness can be reduced as much as possible even when various types of components are to be supplied to an assembly line.

In order to achieve the above object, the “wire harness manufacturing system” according to the present invention is characterized by the following (1) to (4).

(1) A wire harness manufacturing system comprising:

an assembly line that manufactures a wire harness and one or a plurality of supply devices that prepares to supply component magazines in which components of the wire harness are loaded in a holder to the assembly line, wherein each of the supply devices is capable of preparing a plurality of the component magazines which are different according to types of the components, and wherein the component magazines are capable of delivering from the supply devices to at least a part of the series of assembly steps in a state of being independent of both the assembly line and the supply device.

(2) The wire harness manufacturing system according to (1), wherein the supply devices continues to prepare the component magazines regardless of an operating state of the assembly line.

(3) The wire harness manufacturing system according to (1) or (2), wherein the supply devices prepare the component magazines, corresponding associating a consumption number of specific components on the assembly line per unit time to a manufacturing number of the component magazines per unit time loaded with the specific components.

(4) The wire harness manufacturing system according to any one of (1) to (3), wherein the supply devices comprises:

a component tray on which the components are mounted; the holder;

a transport mechanism that transports the components from the component tray to a loading port of the holder; and a loading mechanism that loading the components disposed in the loading port into the holder and forms the component magazines, wherein the component tray is capable of mounting the components thereon separately according to types of the components, and wherein the transport mechanism comprises:

a camera that photographs the components placed on the component tray;

a drive unit that includes a first moving body that is movable with being constrained by a first rail extending in a first direction connecting the component tray to the loading port, a second moving body that is movable while being constrained by a second rail provided on the first moving body so as to extend in a second direction intersecting the first direction, and drive arms that apply a driving force in at least one of the first direction and the second direction to the second moving body and that is capable of moving the second movable body along a movable plane defined by the first direction and the second direction; and a component moving unit that is supported by the second moving body and includes a component chuck movable in a third direction intersecting the moving plane and is capable of holding or releasing the components, and a motor that rotates the component chuck in the moving plane, and wherein the drive unit transports the components from the component tray to the loading port based on an image photographed by the camera so that the components disposed in the loading port are aligned in a predetermined direction.

According to the wire harness manufacturing system with the above configuration in (1), the supply devices (each of the supply devices) are capable of supplying components to the assembly line via the component magazines, and of preparing a plurality of types of component magazines for each type of component. In other words, the supply devices are not dedicated devices different for each type of component (different for product No.), but general-purpose devices that can support various types (product No.) of components. That is, the supply devices and the types (product No.) of components are in a one-to-many relationship via the component magazine instead of a one-to-one relationship as in the system.

Therefore, as compared with the supply devices in the system, the number of supply devices can be reduced, so that installation cost of the supply devices can be reduced. Further, since the component magazine can be used simply in accordance with the specification of the wire harness (for example, since the component magazine corresponding to the type (product No.) of the component can be simply attached to the supply devices), preparation cost of the manufacturing system can be reduced without significantly resetting the supply devices. In other words, by using the component magazine, the assembly line (and accordingly the entire manufacturing system) can be flexibly adapted to various wire harnesses.

Therefore, the wire harness manufacturing system with such a configuration can reduce the manufacturing cost of the wire harness as much as possible even when various types of components are to be supplied to the assembly line.

As another effect, according to the wire harness manufacturing system SYS with such a configuration, the supply devices are indirectly connected to the assembly line (via a component magazine). Therefore, unlike the case where both the supply devices and the assembly line are directly connected as in the supply devices in the system, operation can be continued even if one of the supply devices and the assembly line malfunctions and operation thereof is stopped. In other words, the component magazine functions as a buffer (buffer mechanism) of the entire system. Therefore, the wire harness manufacturing system of such a configuration can improve the stability of the entire system.

All components of the wire harness do not have to be supplied via the above component magazines. For example, a component magazine may be utilized for a part of the components, and a supply device as those in the system may be included separately from the above supply devices.

According to the wire harness manufacturing system with the above configuration in (2), the supply devices continue preparing (manufacturing) component magazines regardless of an operation state of the assembly line (operating or stopped). As a result, for example, it is possible to stock the component magazines during a period in which the assembly line is stopped due to some problems, and to prepare a future demand for the component magazines. Therefore, the wire harness manufacturing system of such a configuration can improve the stability of the entire system.

According to the wire harness manufacturing system having the above configuration in (3), the component magazines can be manufactured in accordance with the actual number of consumed components. Therefore, the wire harness manufacturing system with such a configuration allows the supply devices to be operated efficiently in consideration of a post-process (a series of assembly steps on the assembly line). As a result, manufacturing cost of the wire harness can be further reduced.

According to the wire harness manufacturing system having the above configuration in (4), the component magazines have the function (the function of preparing the above component magazines) required for constructing the above manufacturing system. In other words, the supply devices having such a configuration are an example of actual supply devices that may be used to construct the above manufacturing system.

Further, in order to achieve the above object, the "wire harness manufacturing method" according to the present invention is characterized by the following (5).

(5) A wire harness manufacturing method using one or a plurality of supply devices that prepare to supply component magazines in which components of a wire harness are loaded in a holder to an assembly line of the wire harness, the wire harness manufacturing method comprising:

preparing a plurality of the component magazines which are different according to types of the components in each of the supply devices;

delivering the component magazines from the supply devices to at least a part of the assembly line in a state of being independent of both the assembly line and the supply device; and using the components picked up from the component magazines on the assembly line for manufacturing the wire harness.

According to the wire harness manufacturing method with the above configuration in (5), components are supplied to the assembly line via the component magazines and a plurality of types of component magazines are prepared for each type of component via the supply devices (each of the supply devices). In other words, the supply devices are not dedicated devices different for each type of component (different for product No.), but general-purpose devices that can support various types (product No.) of components. That is, the supply devices and the types (product No.) of components are in a one-to-many relationship via the component magazine instead of a one-to-one relationship as in the manufacturing method in the system.

Therefore, as compared with the manufacturing method in the system, the number of supply devices can be reduced, so that installation cost of the supply devices can be reduced. Further, since the component magazine can be used simply in accordance with the specification of the wire harness (for example, since the component magazine corresponding to the type (product No.) of the component can be simply attached to the supply devices), preparation cost of the manufacturing system can be reduced without significantly resetting the supply devices. In other words, by using the component magazine, the assembly line (and accordingly the entire manufacturing system) can be flexibly adapted to various wire harnesses.

Therefore, the wire harness manufacturing method with such a configuration can reduce the manufacturing cost of the wire harness as much as possible even when various types of components are to be supplied to the assembly line.

As another effect, according to the wire harness manufacturing method with such a configuration, the supply devices and the assembly line are indirectly connected (via a component magazine). Therefore, unlike the case where both the supply devices and the assembly line are directly connected as in the manufacturing method in the system, operation can be continued even if one of the supply devices and the assembly line malfunctions and operation thereof is stopped. In other words, the component magazine functions as a buffer (buffer mechanism) of the entire system. Therefore, the wire harness manufacturing method of such a configuration can improve the stability of the entire system.

According to one or more embodiments, in a wire harness manufacturing system and a wire harness manufacturing method, manufacturing cost of the wire harness can be reduced as much as possible even when various types of components are to be supplied to an assembly line.

The present invention has been briefly described above. Details of the present invention is further clarified by reading a mode for carrying out the invention described below with reference to attached drawings.

BRIEF DESCRIPTION OF THE DRAWINGS

FIG. 2A illustrates a state in which an end portion of the electrical wire is cut. FIG. 2B illustrates a state immediately before a waterproof plug is inserted into the electrical wire in which a tip end portion of a core wire thereof is exposed. FIG. 2C illustrates a state immediately before the terminal is crimped to the electrical wire inserted with the waterproof plug. FIG. 2D illustrates a state in which the crimping of the electrical wire to the terminal is completed.

FIG. 15A illustrates a first modification of the component tray. FIG. 15B illustrates a second modification of the component tray. FIG. 15C illustrates a third modification of the component tray.

DESCRIPTION OF EMBODIMENTS

Hereinafter, a wire harness manufacturing system and a wire harness manufacturing method according to an embodiment of the present invention is described with reference to the drawings.

[Overall Configuration of Manufacturing System]

Figure 1:
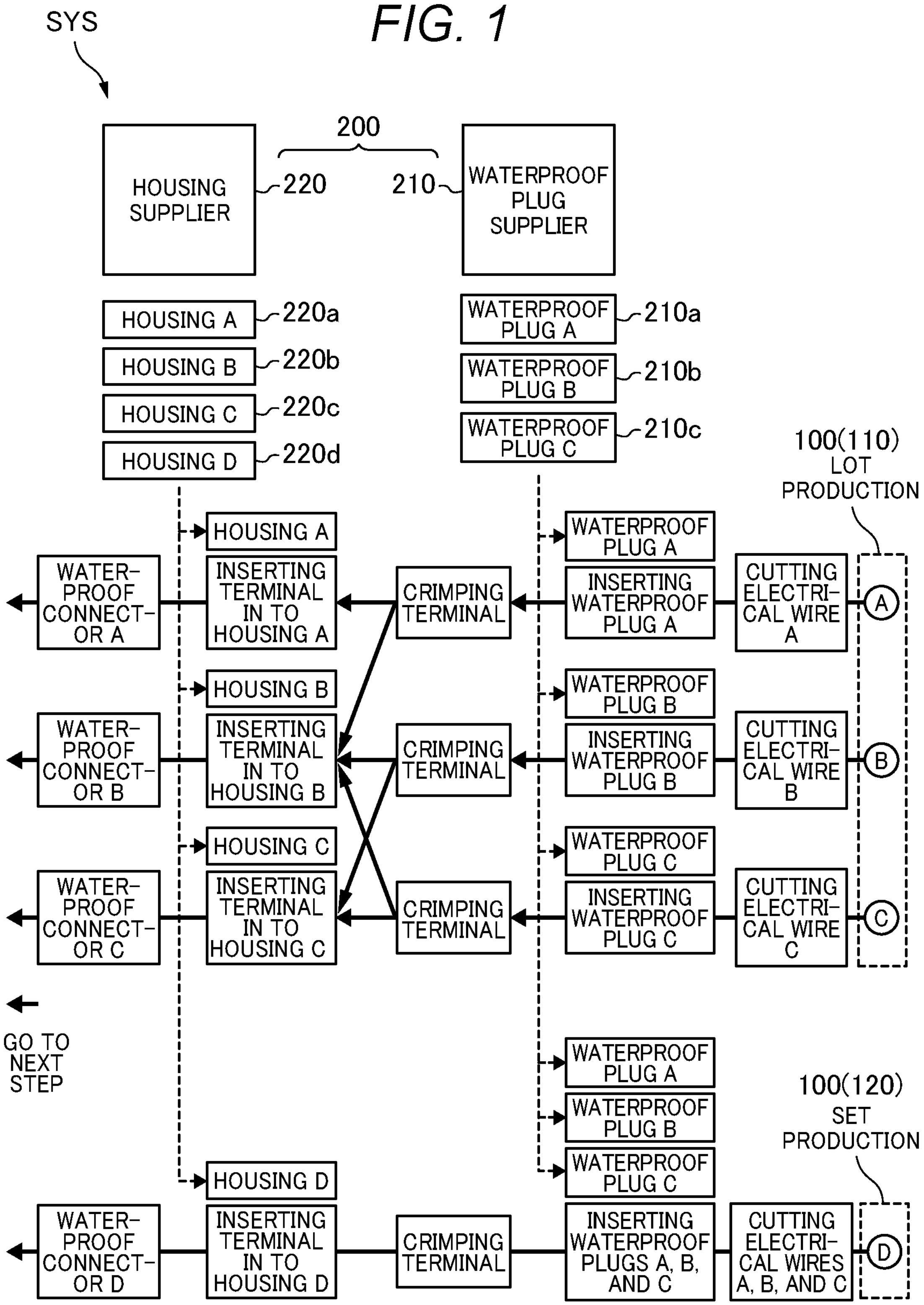
FIG. 1 is a functional block diagram of a wire harness manufacturing system and a wire harness manufacturing method according to an embodiment of the present invention.

As illustrated in FIG. 1, a wire harness manufacturing system SYS according to the embodiment of the present invention includes an assembly line 100 on which components of a wire harness are assembled sequentially, and a plurality of (two in this embodiment) supply devices 200 that prepare to supply the components of a wire harness to the assembly line 100. As to be described below, the supply devices 200 prepare component magazines (210*a* to 210*c*, 220*a* to 220*d*) in which the components of a wire harness are loaded in a holder.

The assembly line 100 may include a lot production line 110 and/or a set production line 120. In other words, the wire harness manufacturing system SYS according to the embodiment of the present invention is applicable to both the lot production line 110 and the set production line 120. In the lot production line 110 (line A, line B, and line C), three types of terminal-attached electrical wires different for each type of waterproof plug (waterproof plugs A to C) are manufactured and used for each type of housing (housings A to C) as necessary, such that three types of waterproof connectors A to C are manufactured independently for each type. Meanwhile, in the set production line 120 (line D), a necessary number of three types of terminal-attached electrical wires different for each type of waterproof plug (waterproof plugs A to C) are manufactured and assembled to a specific housing (housing D), such that a waterproof connector D is manufactured.

The assembly line 100 (lot production line 110, set production line 120) illustrated in FIG. 1 is a part of an assembly line for manufacturing a wire harness. Therefore, the waterproof connectors A to D assembled on the assembly line 100 are sent to a next step for manufacturing the wire harness.

The assembly line 100 is described in more detail below. First, a waterproof plug is a waterproof rubber plug for preventing water and the like from entering a terminal accommodating chamber of a housing. Hereinafter, a step of crimping an electrical wire attached (inserted) with a waterproof plug to a terminal is briefly described with reference to FIGS. 2A to 2D.

Figure 2A:
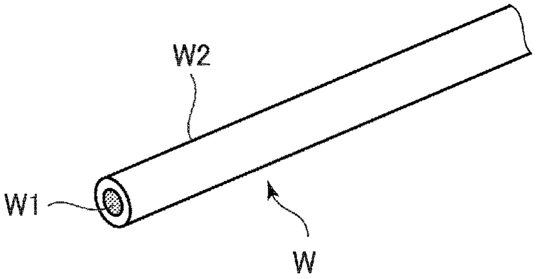
FIGS. 2A to 2D are schematic views for illustrating a step of crimping an electrical wire inserted with a waterproof plug to a terminal.
Figure 2B:
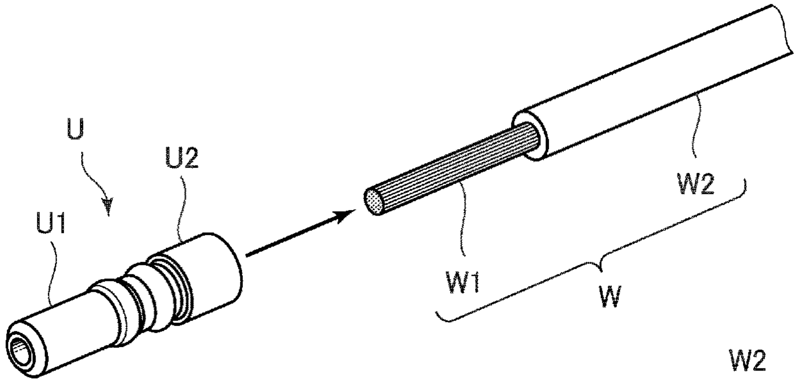

First, as illustrated in FIG. 2A, an electrical wire W in which a core wire W1 is covered with an insulation coating W2 is cut into a predetermined length (lengths different for wire harnesses of each specification). Next, as illustrated in FIG. 2B, a tip end portion of the core wire W1 is exposed by removing (peeling) a tip end portion of the insulation coating W2. In this way, a waterproof plug U is inserted into the electrical wire W in which the tip end portion of the core wire W1 is exposed.

Figure 2C:
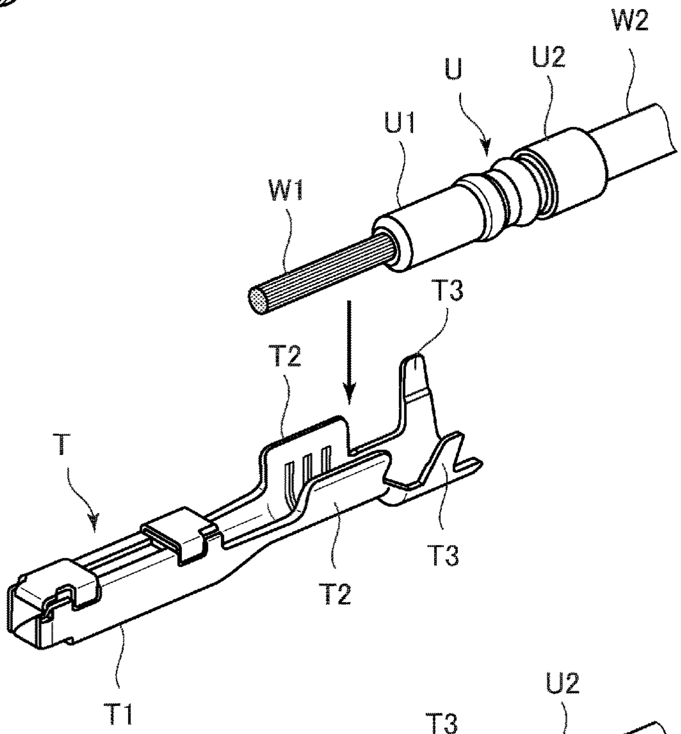
Figure 2D:
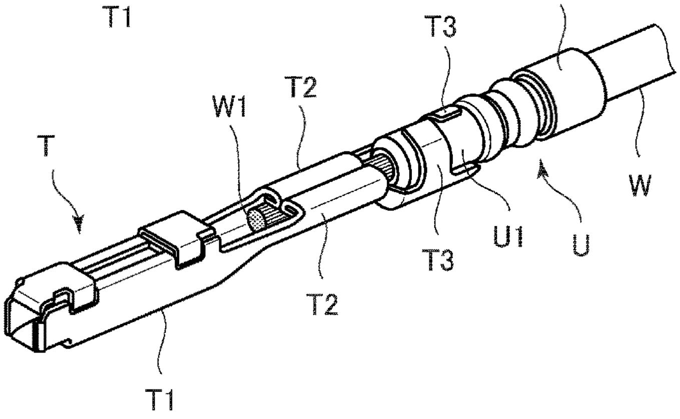

In this embodiment, the waterproof plug U has a stepped cylindrical shape having a small diameter portion U1 and a large diameter portion U2. The waterproof plug U is inserted into the electrical wire W from a large diameter portion U2 side. As a result, as illustrated in FIG. 2C, the exposed core wire W1 and the insulation coating W2 are covered with the small diameter portion U1 and the large diameter portion U2 of the waterproof plug U, respectively. After the electrical wire W inserted with the waterproof plug U is placed at a predetermined position of a terminal T, as illustrated in FIG. 2D, the terminal T is crimped to the electrical wire W.

In this embodiment, the terminal T is a female terminal, and includes an electrical wire connecting portion T1 for receiving a mating male terminal (not illustrated), a first crimping portion (a pair of crimping pieces) T2 for crimping the core wire W1, and a second crimping portion (a pair of crimping pieces) T3 for crimping the waterproof plug U and the insulation coating W2. Accordingly, as illustrated in FIG. 2D, the exposed core wire W1 is crimped by the first crimping portion T2, and the insulation coating W2 is crimped by the second crimping portion T3. Through the above step, the crimping of the electrical wire W to the terminal T is completed.

Referring again to FIG. 1, electrical wires A, B, and C have different types (for example, wire diameters, lengths, and materials). The waterproof plug A, the waterproof plug B, and the waterproof plug C have different types (for example, diameters, lengths, surface shapes, and materials). Additionally, the housing A, the housing B, the housing C, and the housing D have different types (for example, shapes, materials, types and numbers of terminal-attached electrical wires to be inserted).

On the line A, a tip end portion of a core wire of the electrical wire A is exposed when the electrical wire A is cut to a predetermined length, and then the waterproof plug A is inserted into the electrical wire A in which the tip end portion of the core wire is exposed, and then a terminal is crimped to the electrical wire A inserted with the waterproof plug A. Similarly, on the lines B and C, a terminal is crimped to the electrical wire B after the waterproof plug B is inserted, and a terminal is crimped to the electrical wire C after the waterproof plug C is inserted. Next, the electrical wire A crimped by the terminal is assembled to the housing A (the terminal of the electrical wire A is inserted into a terminal accommodating chamber of the housing A), such that the waterproof connector A is manufactured. The electrical wires A, B, and C crimped by terminals are assembled to the housing B (the terminals of the electrical wires A, B, and C are inserted into a terminal accommodating chamber of the housing B), such that the waterproof connector B is manufactured. Additionally, the electrical wires B and C crimped by terminals are assembled to the housing C (the terminals of the electrical wires B and C are inserted into a terminal accommodating chamber of the housing C), such that the waterproof connector C is manufactured.

In FIG. 1, the electrical wires A, B, and C crimped by terminals are mutually used on a plurality of lines A, B, and C. However, the assembly line 100 may be configured such that only the electrical wire A crimped by the terminal is used on the line A, only the electrical wire B crimped by the terminal is used on the line B, and only the electrical wire C crimped by the terminal is used on the line C.

On the line D, tip end portions of core wires of the electrical wires A, B, and C are exposed when the electrical wires A, B, and C are cut to a predetermined length respectively, and then the waterproof plugs A, B, and C are inserted into the electrical wires A, B, and C in which the tip end portions of the core wires are exposed, and then terminals are crimped to the electrical wires A, B, and C inserted with the waterproof plugs A, B, and C. That is, the electrical wires A, B, and C crimped by the terminals are manufactured collectively. Next, the electrical wires A, B, and C crimped by the terminals are inserted into corresponding terminal insertion holes of the housing D, respectively, such that the waterproof connector D is manufactured.

On the lines A to D, waterproof plug magazines 210*a* to 210*c* formed by a waterproof plug supplier 210 are supplied to a step of inserting corresponding waterproof plugs. Similarly, housing magazines 220*a* to 220*d* formed by a housing supplier 220 are supplied to a step of inserting terminals into corresponding housings. Here, the waterproof plug magazines 210*a* to 210*c* refer to holders in which a plurality of waterproof plugs of the same type are loaded in a row in a state of being aligned in the same orientation (see FIG. 3). The housing magazines 220*a* to 220*d* refer to holders in which a plurality of housings of the same type are loaded in a row in a state of being aligned in the same orientation (not illustrated).

Figure 3:
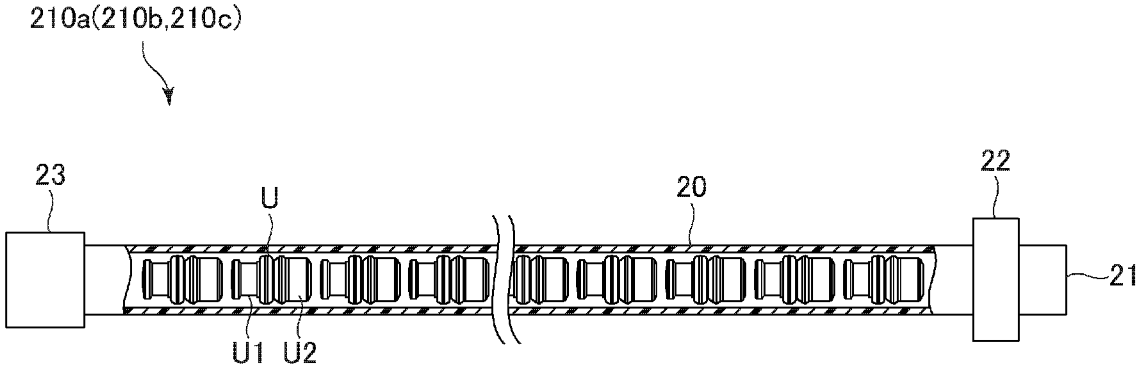
FIG. 3 is a partial cross sectional view of a waterproof plug magazine in which a plurality of waterproof plugs are loaded in a holder.
Figure 4:
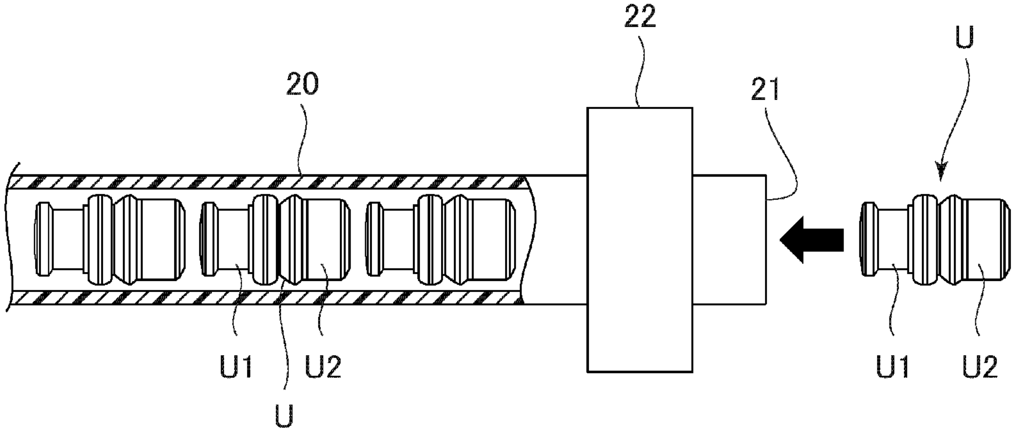
FIG. 4 is a view illustrating a state when a waterproof plug is loaded into the holder.

Hereinafter, the waterproof plug magazines 210*a* to 210*c* are briefly described with reference to FIGS. 3 and 4. In the waterproof plug magazine 210*a* (the waterproof plug magazines 210*b* and 210*c* also have similar configurations) illustrated in FIGS. 3 and 4, a plurality of waterproof plugs of the same type are loaded in a row in a cylindrical holder 20 having a circular cross section made of a resin that can be easily deformed in a state of being aligned in the same orientation. As illustrated in FIG. 4, the waterproof plug magazine 210*a* is formed by inserting each waterproof plug U into the holder 20 sequentially by the waterproof plug supplier 210 from an insertion opening 21 (opening) on one end side of the holder 20 in a state of facing a direction of inserting the small-diameter portion U1.

A fixing jig 22 is provided near the insertion opening 21 of the holder 20. As to be described below, the fixing jig 22 is used when the holder 20 is mounted and fixed to a predetermined position of the waterproof plug supplier 210 to form the waterproof plug magazine 210*a*. A cover 23 is provided at an opening on another end side of the holder 20. The cover 23 has a function of preventing the waterproof plug U loaded in the holder 20 from dropping from the opening on the other end side of the holder 20.

Referring back to FIG. 1, the waterproof plug supplier 210 forms a plurality of types of waterproof plug magazines 210*a* to 210*c* for each type of waterproof plug. In this embodiment, the waterproof plug supplier 210 forms the waterproof plug magazine 210*a* in which only a plurality of waterproof plugs A are loaded, the waterproof plug magazine 210*b* in which only a plurality of waterproof plugs B are loaded, and the waterproof plug magazine 210*c* in which only a plurality of waterproof plugs C are loaded.

The formed waterproof plug magazines 210*a* to 210*c* are picked up from the waterproof plug supplier 210 and are respectively supplied to corresponding lines in an independent state (in a state of being independent from both the waterproof plug supplier 210 and the assembly line 100). In this embodiment, the waterproof plug magazine 210*a* is supplied to the step of inserting the waterproofing stopper to the lines A and D, the waterproof plug magazine 210*b* is supplied to the step of inserting the waterproofing stopper to the lines B and D, and the waterproof plug magazine 210*c* is supplied to the step of inserting the waterproofing stopper to the lines C and D.

In this way, the types of waterproof plug magazines 210*a* to 210*c* formed by the waterproof plug supplier 210 are delivered to corresponding steps of corresponding lines from the waterproof plug supplier 210 in a state of being independent from both the assembly line 100 and the waterproof plug supplier 210. Taking the waterproof plug out from the waterproof plug magazine on each line and supply of the waterproof plug magazine to each assembly line may be performed automatically using a device or be performed manually.

The waterproof plug magazines 210*a* to 210*c* have been described above. The same applies to the housing magazines 220*a* to 220*d*. That is, the housing supplier 220 forms a plurality of types of housing magazines 220*a* to 220*d* for each type of housing. In this embodiment, the housing supplier 220 forms the housing magazine 220*a* in which only a plurality of housings A are loaded, the housing magazine 220*b* in which only a plurality of housings B are loaded, the housing magazine 220*c* in which only a plurality of housings C are loaded, and the housing magazine 220*d* in which only a plurality of housings D are loaded.

The formed types of housing magazines 220*a* to 220*d* are picked up from housing supplier 220 and supplied respectively to corresponding lines in an independent state (in a state of being independent from both the housing supplier 220 and the assembly line 100). In this embodiment, the housing magazine 220*a* is supplied to a step of inserting the terminal to the line A, the housing magazine 220*b* is supplied to a step of inserting the terminal to the line B, the housing magazine 220*c* is supplied to a step of inserting the terminal to the line C, and the housing magazine 220*d* is supplied to a step of inserting the terminal to the line D.

In this way, the types of housing magazines 220*a* to 220*d* formed by the housing supplier 220 are delivered to corresponding steps of corresponding lines from the housing supplier 220 in a state of being independent from both the assembly line 100 and the housing supplier 220. Taking the housing out from the housing magazine on each line and supply of the housing magazine to each assembly line may be performed automatically using a device or be performed manually.

The waterproof plug supplier 210 can continue to form and prepare the waterproof plug magazines 210*a* to 210*c* regardless of an operation state of the assembly line 100 (no matter the assembly line 100 is operating or stopped). This makes it possible to stock the waterproof plug magazines 210*a* to 210*c* during a period in which the assembly line 100 is stopped due to such as a problem, and to prepare a future demand for the waterproof plug magazines 210*a* to 210*c*. The same applies to the housing supplier 220.

Further, the waterproof plug supplier 210 is capable of associating the number of consumed waterproof plug magazines 210*a* to 210*c* on the assembly line 100 per unit time and the number of manufactured waterproof plug magazines 210*a* to 210*c* per unit time for each type of the waterproof plugs A to C, and of forming and preparing the waterproof plug magazines 210*a* to 210*c* at the same time. Accordingly, the waterproof plug magazines 210*a* to 210*c* can be manufactured in accordance with the actual number of consumed waterproof plugs A to C for each type of the waterproof plugs A to C. The same applies to the housing supplier 220.

The wire harness manufacturing system SYS according to the embodiment of the present invention has been described above with reference to FIGS. 1 to 4. Hereinafter, a configuration of the waterproof plug supplier 210 is described in detail with reference to FIGS. 5 to 16. Additionally, the housing supplier 220 may be configured similarly to the waterproof plug supplier 210, and description thereof is omitted accordingly.

[Configuration of Waterproof Plug Supplier]

Figure 5:
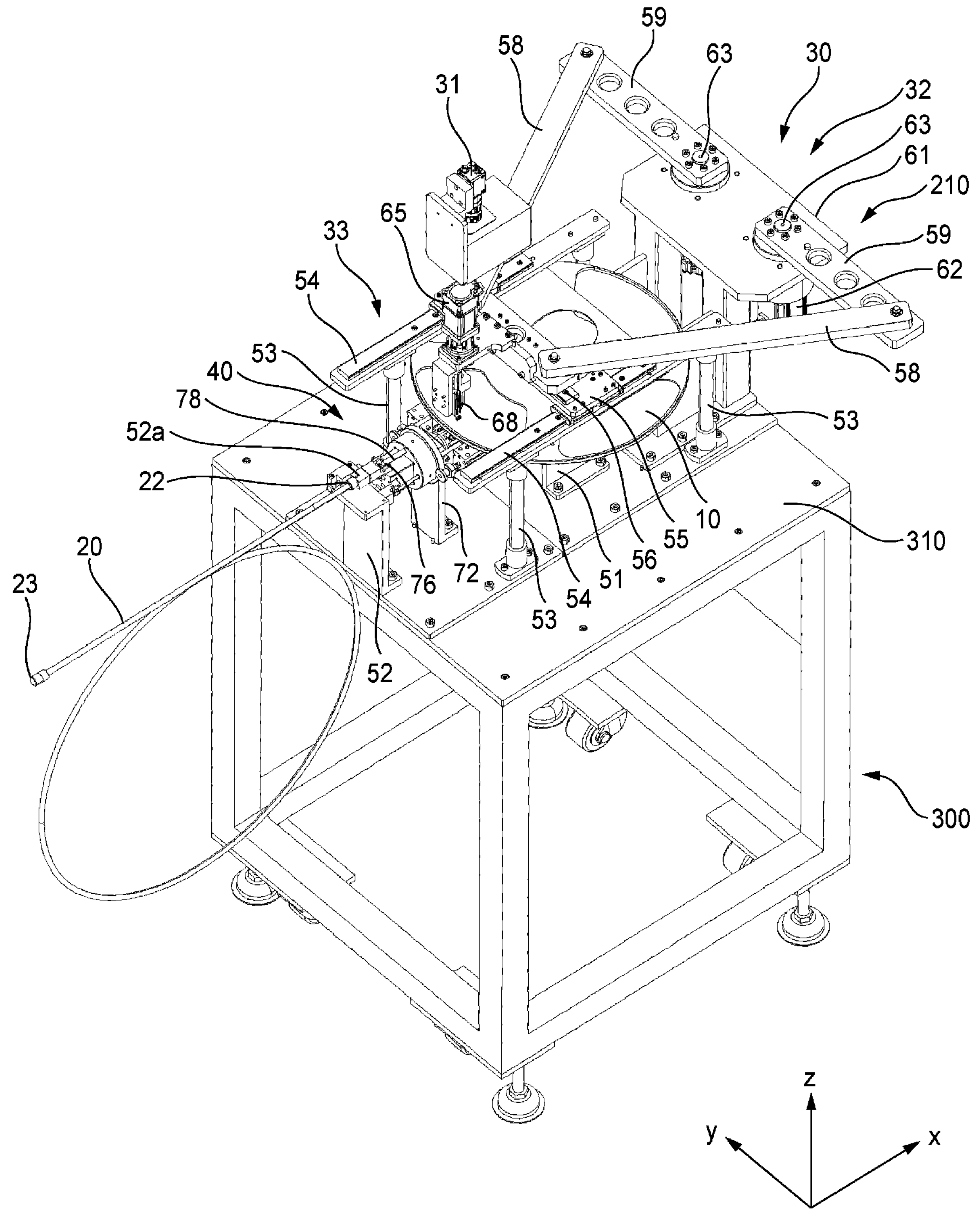
FIG. 5 is a perspective view illustrating an entire waterproof plug supplier in FIG. 1.

As illustrated in FIG. 5, the waterproof plug supplier 210 is provided on an upper surface 310 of a movable work table 300. Therefore, the waterproof plug supplier 210 can be moved with respect to arrangement of the lines A to D as appropriate.

The waterproof plug supplier 210 includes a component tray 10 on which the waterproof plug U is placed, the above holder 20 (see FIGS. 3 and 4) used for forming the waterproof plug magazine, a transport mechanism 30 for transporting the waterproof plug U from the component tray 10 to vicinity of the insertion port 21 of the holder 20, and a loading mechanism 40 for loading the waterproof plug U disposed in the vicinity of the insertion port 21 of the holder 20 into the holder 20 and forming the waterproof plug magazine. Hereinafter, as illustrated in FIG. 5, an x-axis direction, a y-axis direction, and a z-axis direction orthogonal to each other are defined for convenience of illustration.

Figure 8:
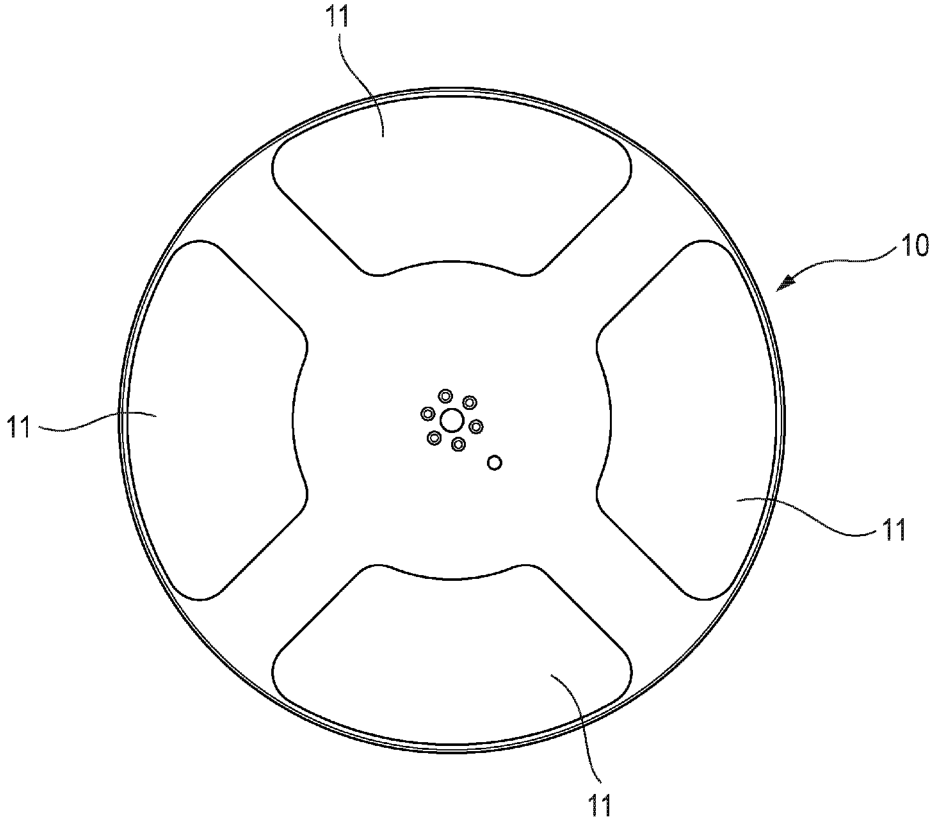
FIG. 8 is a plan view of a component tray in FIG. 5.

As illustrated in FIGS. 5 and 8, the component tray 10 is a disk-shaped member made of a resin. The component tray 10 is fixed to be rotatable in a circumferential direction along the x-y plane at a position above a predetermined distance from the upper surface 310 via a stay 51 erected upward (a positive direction of the z-axis) from a central part of the upper surface 310 of the work table 300. Adjustment of an orientation of the component tray 10 in the circumferential direction may be automatically performed using a device or be performed manually.

As illustrated in FIG. 8, a plurality of grooves 11 are formed in an upper surface of the component tray 10. In this embodiment, four grooves 11 having the same shape are formed independently at an equal interval in the circumferential direction. A plurality of types of waterproof plugs corresponding to specifications of wire harnesses are separately placed in the grooves 11. During operation of the waterproof plug supplier 210, the orientation of the component tray 10 in the circumferential direction is adjusted such that each of the four grooves 11 is located on a positive side of the x-axis, a negative side of the x-axis, a positive side of the y-axis, and a negative side of the y-axis, and only a waterproof plug placed in a groove 11 (hereinafter referred to as a "selected groove") that is on the negative side of the x-axis is supplied to form the waterproof plug magazine.

Figure 6:
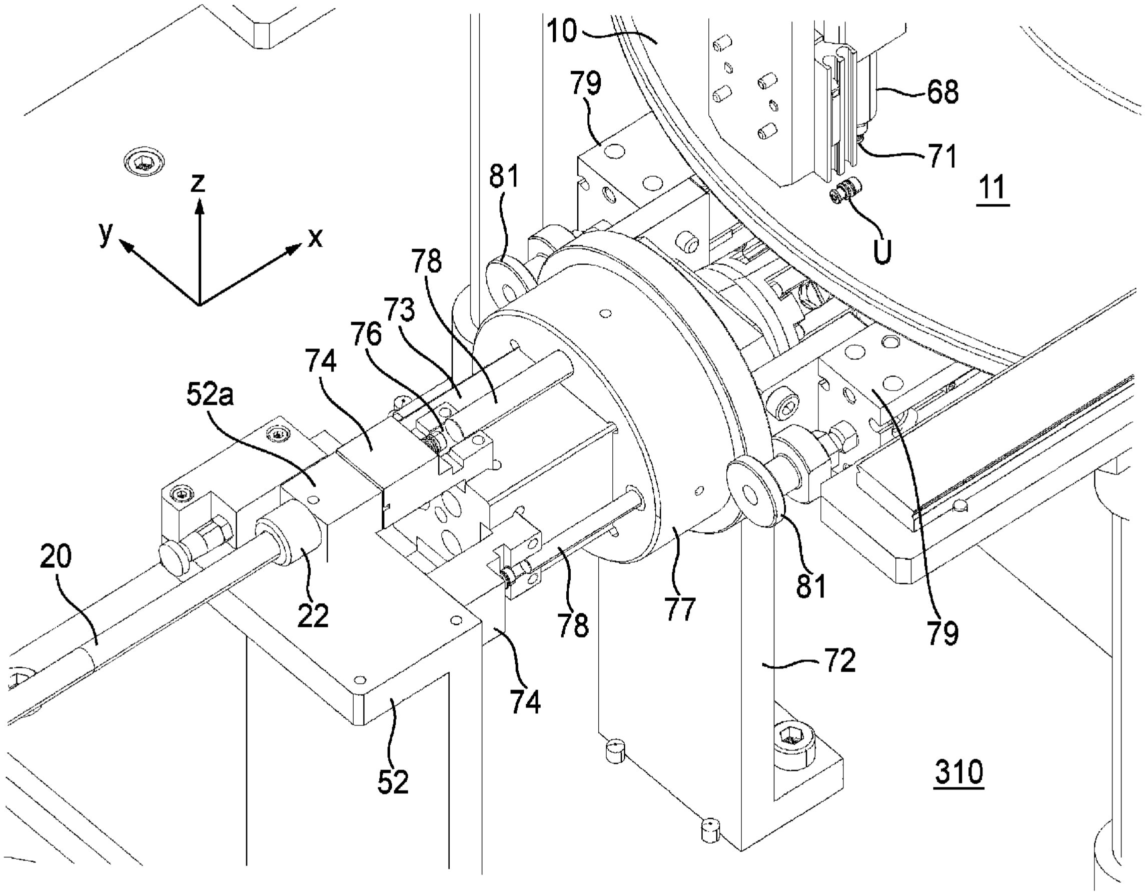
FIG. 6 is a partial enlarged view of a periphery of a loading mechanism in FIG. 5.
Figure 11:
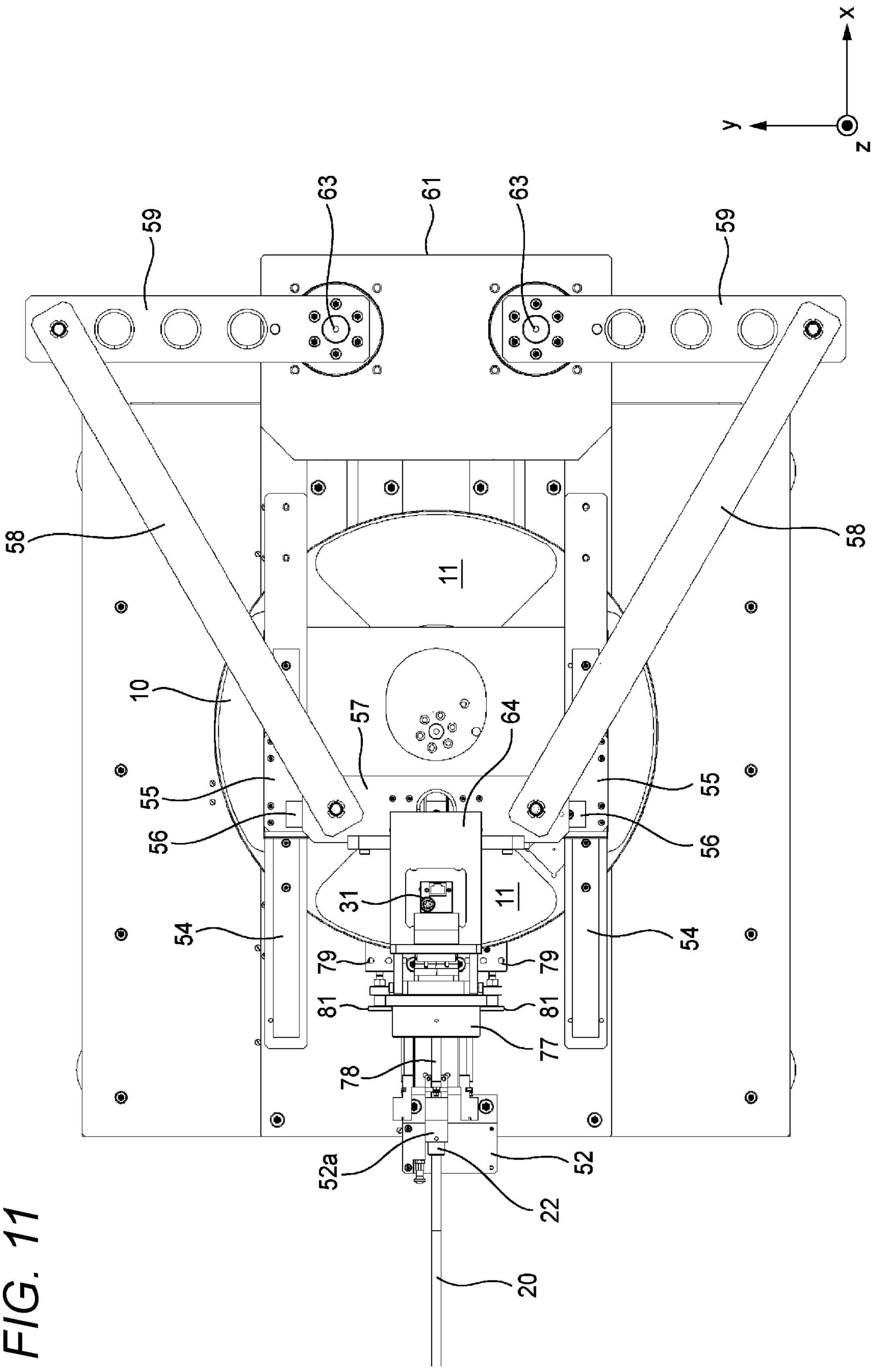
FIG. 11 is a plan view (top view) of the waterproof plug supplier in FIG. 5.

As illustrated in FIGS. 5, 6, and 11, the insertion opening 21 (see also FIGS. 3 and 4) of the holder 20 is inserted into an attachment portion 52*a* (a through hole not illustrated that extends in the x-axis direction) that is provided on an upper surface of the stay 52 erected upward from an edge of the upper surface 310 of the work table 300 in the negative side of the x-axis, such that the fixing jig 22 (see also FIGS. 3 and 4) is detachably fixed to the attachment portion 52*a*. Accordingly, an end portion of the holder 20 is detachably fixed to the attachment portion 52*a*.

As illustrated in FIG. 5, the transport mechanism 30 includes a camera 31, a drive unit 32, and a component moving unit 33. The camera 31 is fixedly disposed above the groove (selected groove) of the component tray 10 via a stay (not illustrated) fixed to the upper surface 310 of the work table 300. The camera 31 photographs the waterproof plug U placed in the groove 11 (selected groove) from above.

The drive unit 32 is a part related to operation of moving a suction nozzle 68 to be described below along the x-y plane for holding the waterproof plug U. A configuration related to the drive unit 32 is described below.

Figure 10:
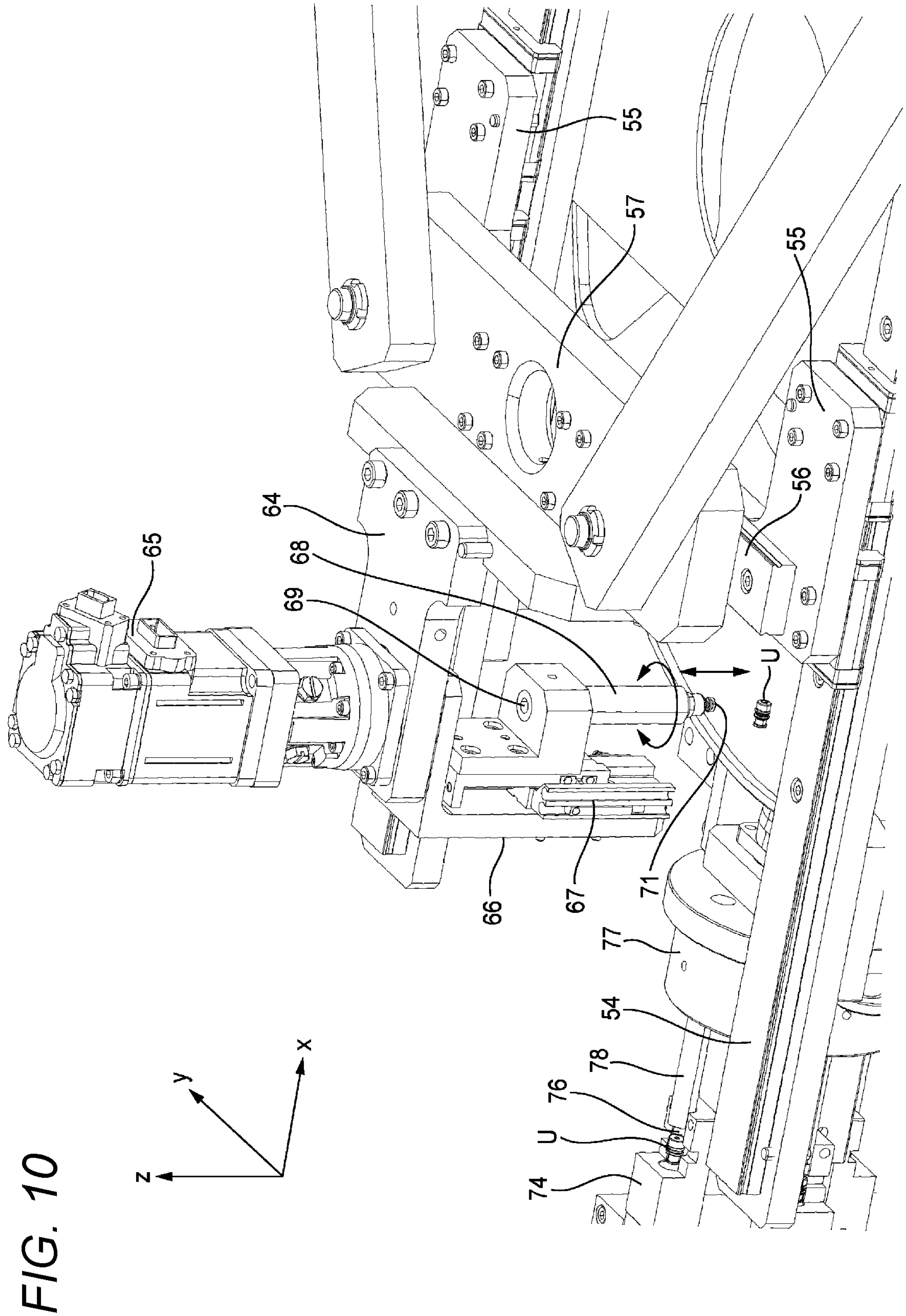
FIG. 10 is a partial enlarged view of a periphery of a component moving unit in FIG. 5.

As illustrated in FIGS. 5, 10, 11, and the like, a pair of first rails 54 extending parallel to each other at a predetermined distance along the x-axis direction is fixed to a position above the component tray 10 via a plurality of stays 53 on the upper surface 310 of the work table 300 that are erected upward from a peripheral part of the component tray 10.

The pair of first rails 54 is provided with a first moving body 55 that is movable in the x-axis direction (corresponding to "first direction" of the present invention) while being constrained by the pair of first rails 54 so as to straddle the pair of first rails 54. A second rail 56 that extends in the y-axis direction (corresponding to "second direction" of the present invention) is provided on an upper surface of the first moving body 55.

The second rail 56 is provided with a second moving body 57 that is movable in the y-axis direction while being restrained by the second rail 56. As a result, the second moving body 57 is arbitrarily movable along the x-y plane. As to be described below, the suction nozzle 68 is indirectly fixed to the second moving body 57.

One end portions of a pair of rod-shaped first drive arms 58 are coupled to end portions on both sides of the second movable body 57 in the y-axis direction so as to be relatively rotatable along the x-y plane. One end portions of a pair of rod-shaped second drive arms 59 are coupled to other end portions of the pair of first drive arms 58 so as to be relatively rotatable along the x-y plane.

A pair of electric motors 62 are fixed, at a predetermined interval, to a stay 61 erected upward from an edge of the upper surface 310 of the work table 300 on the positive side of the x-axis along the y-axis direction. Motor shafts 63 of the pair of electric motors 62 project separately from an upper surface of the stay 61 toward the positive direction of the z-axis. Other end portions of the pair of second drive arms 59 are integrally connected to the pair of motor shafts 63 separately.

The drive unit 32 is configured as described above. As a result, a driving force in the x-axis direction and the y-axis direction is applied from the pair of first driving arms 58 to the second moving body 57 by individually adjusting rotation angles of the motor shafts 63 of the pair of electric motors 62, such that a position of the second moving body 57 in the x-y plane can be arbitrarily adjusted.

The component moving unit 33 is a part related to operation of moving the suction nozzle 68 for holding the waterproof plug U along the z-axis direction and operation of rotating the suction nozzle 68 extending in the z-axis direction around its axis. A configuration related to the component moving unit 33 is described below.

As illustrated in FIG. 10, a stay 64 is fixed to the second moving body 57 to extend in the negative direction of the x-axis. An electric motor 65 is fixed to the stay 64. A motor shaft (not illustrated) of the electric motor 65 protrudes from a lower surface of the stay 64 toward the negative direction of the z-axis. An L-shaped bracket 66 is integrally coupled to the motor shaft of the electric motor 65.

The rod-like suction nozzle 68 is provided in a suspended portion of the bracket 66 that extends in the negative direction of the z-axis via a drive mechanism 67 so as to be relatively movable along the z-axis direction (corresponding to "third direction" of the present invention). By controlling the driving mechanism 67, a position of the suction nozzle 68 in the z-axis direction with respect to the bracket 66 (in other words, the second moving body 57) can be adjusted.

An axis of the suction nozzle 68 is located coaxially with that of the motor shaft of the electric motor 65. Therefore, the suction nozzle 68 is rotated around the axis (in the x-y plane) by adjusting a rotation angle of the motor shaft of the electric motor 65, such that the position of the suction nozzle 68 in the rotation direction can be adjusted.

A through hole 69 is formed in the suction nozzle 68 along the axis thereof. An upper end opening of the through hole 69 is attached with an end portion of a suction hose (not illustrated), and another end portion of the hose is connected to a vacuum pump (not illustrated) for suction. A lower end of the through hole 69 functions as a suction opening 71. By controlling the vacuum pump, the suction nozzle 68 is capable of sucking and holding the waterproof plug U in vicinity of the suction opening 71, and of releasing the held waterproof plug U.

The transport mechanism 30 has been described above. Next, a configuration related to the loading mechanism 40 is described.

Figure 9:
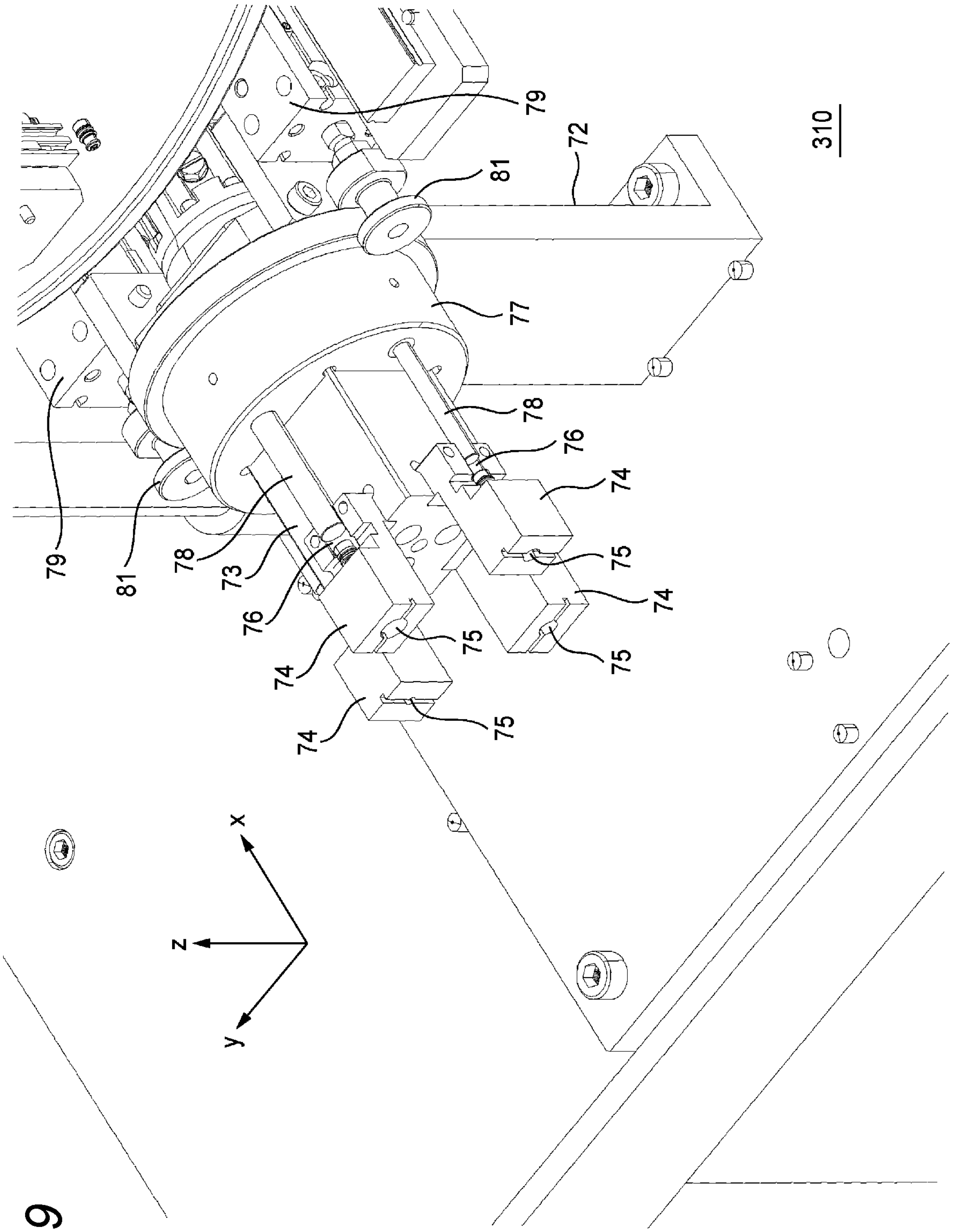
FIG. 9 is a view of a part of the configuration that is omitted in FIG. 6 for illustrating the loading mechanism.

As illustrated in FIGS. 6 and 9, a shaft 73 having a rectangular cross section (square shape) is fixed to a stay 72 on the upper surface 310 of the work table 300 that is erected upward from a part between the component tray 10 and the stay 52 so as to extend in the negative direction of the x-axis and to be rotatable appropriately around a shaft center thereof. The adjustment of the position of the shaft 73 in the rotation direction may be automatically performed using a device or may be performed manually. Additionally, the stay 52 in FIG. 6 is omitted in FIG. 9 for convenience of illustration.

Particularly, as illustrated in FIG. 9, brackets 74 are fixed at four edges corresponding to four sides of the shaft 73 at a tip end portion thereof (end portion in the negative direction of the z-axis) so as to extend in the negative direction of the x-axis. Each of the brackets 74 is formed with a through hole 75 extending in the x-axis direction in a negative side part of the x-axis, and a groove 76 that continuously extends in the positive direction of the x-axis from the through hole 75 and opens upward is formed in a positive side part of the x-axis. The waterproof plug U carried by the suction nozzle 68 is placed in grooves 76.

The four brackets 74 correspond to the four grooves 11 of the component tray 10, respectively. That is, the inner diameter of through hole 75 has a size corresponding to a maximum outer diameter of the waterproof plug U placed in the corresponding groove 11 among the four grooves 11 of the component tray 10. Therefore, in this embodiment, inner diameters of through holes 75 of the four brackets are different from each other.

During operation of the waterproof plug supplier 210, the position of the shaft 73 in the rotation direction is adjusted such that each of the four brackets 11 is located on the positive side of the y-axis, the negative side of the y-axis, a positive side of the z-axis, and a negative side of the z-axis, and only a bracket 74 (hereinafter referred to as a "selected bracket") that is placed in the positive side of the z-axis is supplied to form the waterproof plug magazine.

That is, as illustrated in FIG. 6, the bracket 74 (selected bracket) is disposed close to the positive side of the x-axis of the attachment portion 52*a* of the stay 52, and the through hole 75 of the bracket 74 (selected bracket) is disposed coaxially with the through hole in the attachment portion 52*a*. As a result, the waterproof plug U placed in the groove 76 of the bracket 74 (selected bracket) is pushed toward the negative direction of the x-axis, such that the waterproof plug U passes through the through hole 75 of the bracket 74 (selected bracket), the through hole of the mounting portion 52*a*, and the insertion opening 21 (see FIGS. 3 and 4) of the holder 20 and is loaded in the holder 20.

A moving member 77 having a stepped cylindrical shape outer periphery is inserted into the shaft 73 so as to be movable relative to the shaft 73 in the x-axis direction and not rotatable relatively. Four push-in bars 78 are fixed at an end surface of the moving member 77 on the negative side of the x-axis, so as to protrude toward the groove 76 of the corresponding bracket 74 in negative direction of the x-axis.

Therefore, in the state illustrated in FIG. 6, the moving member 77 is moved relative to the shaft 73 on the negative direction side of the z-axis, such that a tip end surface of a push-in bar 78 (hereinafter, referred to as "selected push-in bar" particularly) corresponding to the bracket 74 (selected bracket) is pushed into the waterproof plug U placed in the groove 76 of the bracket 74 (selected bracket) toward the negative direction of the x-axis, and the waterproof plug U can be filled in the holder 20 consequently.

A pair of drive mechanisms 79 capable of adjusting positions of a pair of grasping members 81 in the x-axis direction are fixed to the stay 72. The pair of grasping members 81 grasps a flange portion of the moving member 77 on the positive side of the x-axis. Therefore, the position of the moving member 77 in the x-axis direction can be adjusted by controlling the pair of driving mechanisms 79. In other words, by controlling the pair of drive mechanisms 79, the waterproof plug U placed in the groove 76 of the bracket 74 (selected bracket) can be pushed toward the negative direction of the x-axis via the selected push-in bar 78.

The pair of electric motors 62, the electric motor 65, the drive mechanism 67, the drive mechanisms 79, and the vacuum pump described above are controlled by a control device (microcomputer) (not illustrated). The configuration of the waterproof plug supplier 210 has been described above.

[Operation of Waterproof Plug Supplier]

Next, operation when the waterproof plug supplier 210 forms the waterproof plug magazine is described with reference to a flowchart illustrated in FIG. 12. The processing illustrated in this flowchart is performed by the control device described above.

Figure 7:
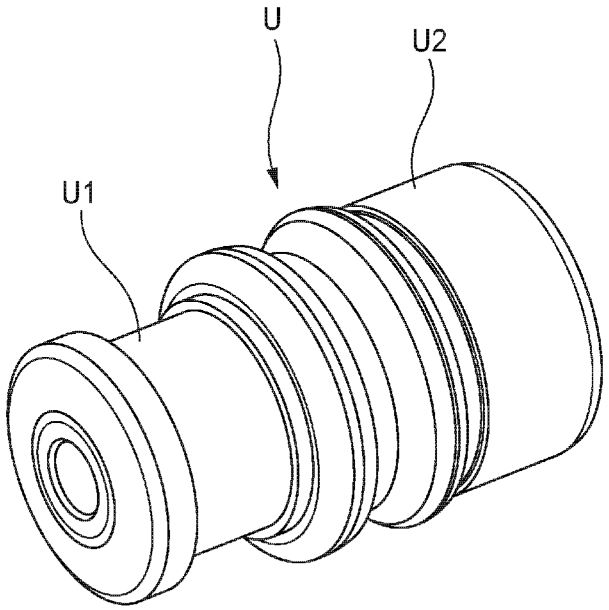
FIG. 7 is a view illustrating an example of a waterproof plug that constitutes the waterproof plug magazine in FIG. 5.

Before starting this processing, a plurality of waterproof plugs U of a type corresponding to the waterproof plug magazine to be formed are placed in the groove 11 (selected groove) of the component tray 10, and the holder 20 and the bracket 74 (selected bracket and selected push-in bar 78) need to be switched to those corresponding to the type of waterproof plug U. As illustrated in FIG. 7, the waterproof plug U that has a stepped cylindrical shape having the small diameter portion U1 and the large diameter portion U2 is used, which is similar as that illustrated in FIG. 4. As illustrated in FIG. 4, the waterproof plug U is sequentially inserted into the holder 20 with the small diameter portion U1 side facing in the insertion direction (the negative direction of the x-axis).

Figure 14:
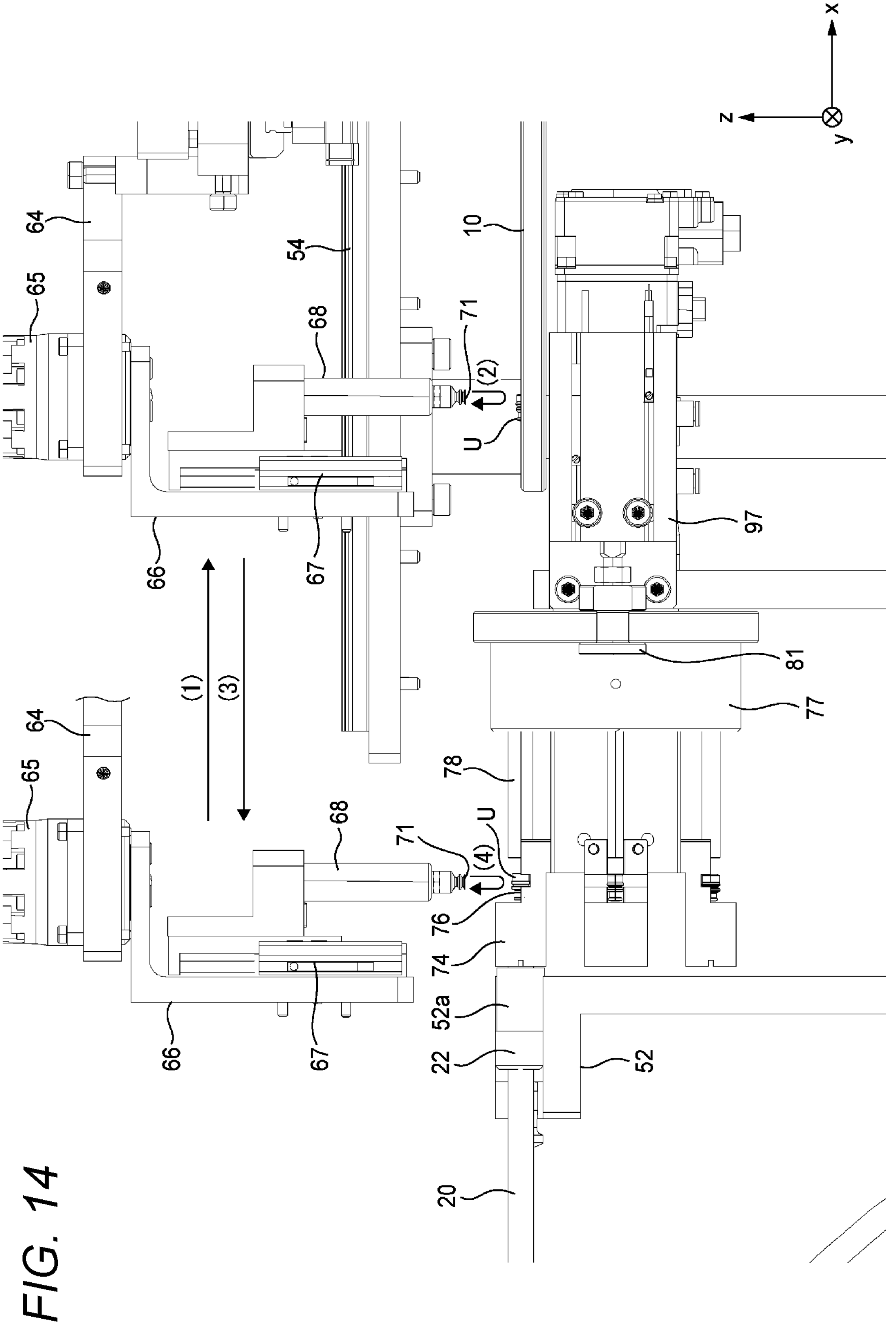
FIG. 14 is a view for illustrating movement of the waterproof plug supplier in FIG. 5 when forming a waterproof plug magazine.

First, in Step S5, it is determined whether or not the suction nozzle 68 is at an initial position. Here, as illustrated in FIG. 14, the initial position refers to a position where the suction nozzle 68 is disposed above the groove 76 (hereinafter, also referred to as a "magazine insertion opening") of the bracket 74 (selected bracket).

When the suction nozzle 68 is at the initial position ("Yes" in Step S5), the processing directly proceeds to Step S15. When the suction nozzle 68 is not at the initial position ("No" in Step S5), the suction nozzle 68 is moved to the initial position in Step S10, and the processing then proceeds to Step S15.

In Step S15, the plurality of waterproof plugs U placed in the groove 11 (selected groove) of the component tray 10 are photographed by the camera 31. As described above, the camera 31 photographs when the suction nozzle 68 is at the initial position based on a fact that, when the suction nozzle 68 is at the initial position, the driving unit 32 and the component moving unit 33 are located outside an imaging range of the camera 31 (accordingly, the driving unit 32 and the component moving unit 33 do not interfere with the photographing).

Next, in Step S20, pattern matching is performed based on the photographed image. In this embodiment, the pattern matching refers to operation of specifying positions (x-y coordinates) of the plurality of waterproof plugs U placed in the groove 11 (selected groove).

Figure 13:
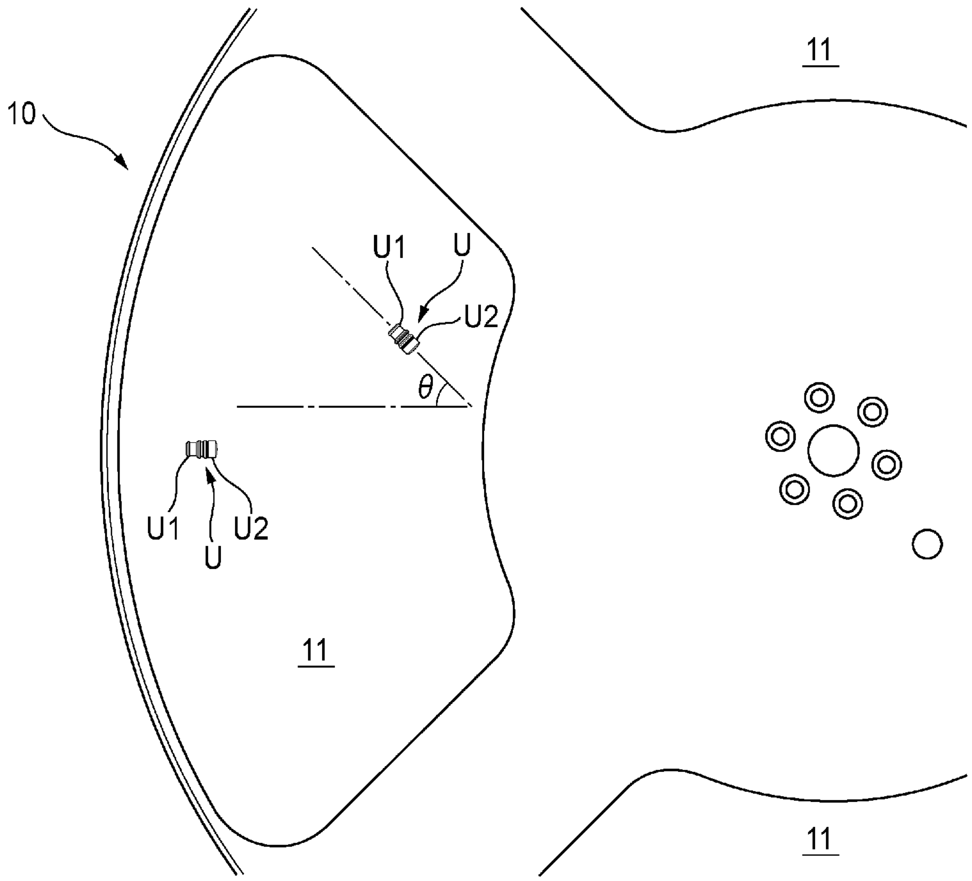
FIG. 13 is a view for illustrating an inclination θ of a waterproof plug placed on the component tray.

Next, in Step S25, based on the result of the pattern matching, the waterproof plug U to be gripped is determined. Subsequently, in Step S30, an inclination θ of the determined waterproof plug U is specified. As illustrated in FIG. 13, the inclination θ refers to an angle formed by a direction in which the waterproof plug U is placed in the magazine insertion opening (a direction in which the small diameter portion U1 faces the negative direction of the x-axis) and the direction of the determined waterproof plug U.

Next, in Step S35, the suction nozzle 68 is moved along the x-y plane until right above the determined waterproof plug U while being rotated by an angle θ (see (1) in FIG. 14). Subsequently, in Step S40, the suction nozzle 68 is lowered in the negative direction of the z-axis (see (2) in FIG. 14). As a result, the suction opening 71 of the suction nozzle 68 is located right above the determined waterproof plug U. In this state, the determined waterproof plug U is sucked to the suction opening 71 of the suction nozzle 68.

Subsequently, in Step S45, the suction nozzle 68 is moved to the initial position while being reversely rotated at the angle θ (see (3) in FIG. 14). Next, in Step S50, the suction nozzle 68 is lowered in the negative direction of the z-axis (see (4) in FIG. 14). As a result, the suction opening 71 of the suction nozzle 68 is located right above the magazine insertion opening. In this state, the waterproof plug U sucked to the suction opening 71 of the suction nozzle 68 is dropped. Thereafter, the suction nozzle 68 is returned to the initial position.

As a result, the waterproof plug U is placed in the magazine insertion opening (groove 76) in a direction in which the small diameter portion U1 side faces the negative direction of the x-axis. Then, in Step S55, the waterproof plug U placed in the magazine insertion opening (groove 76) is pushed in by the selected push-in bar 78, such that the waterproof plug U is loaded into the holder 20 (magazine).

By repeating the above operation until a predetermined number of waterproof plugs U are loaded in the holder 20, the waterproof plug magazine (for example, the waterproof plug magazines 210*a* to 210*c* in FIG. 1) is completed, in which the predetermined number of waterproof plugs U of the same type are loaded in the holder 20 in a state of being aligned in the same orientation.

The completed waterproof plug magazine is picked up from the waterproof plug supplier 210. Thereafter, in order to form a next waterproof plug magazine, the component tray 10 is rotated such that the groove 11 becomes a selected groove in which the waterproof plug U of a type corresponding to the next waterproof plug magazine is placed, and the shaft 73 is rotated such that the bracket 74 (and the push-in bar 78) corresponding to the type of the waterproof plug U becomes the bracket 74 (selected bracket, and selected push-in bar 78), and the holder 20 corresponding to the type of the waterproof plug U is attached to the waterproof plug supplier 210. Then, the above processing is performed again to complete the next waterproof plug magazine.

Figure 12:
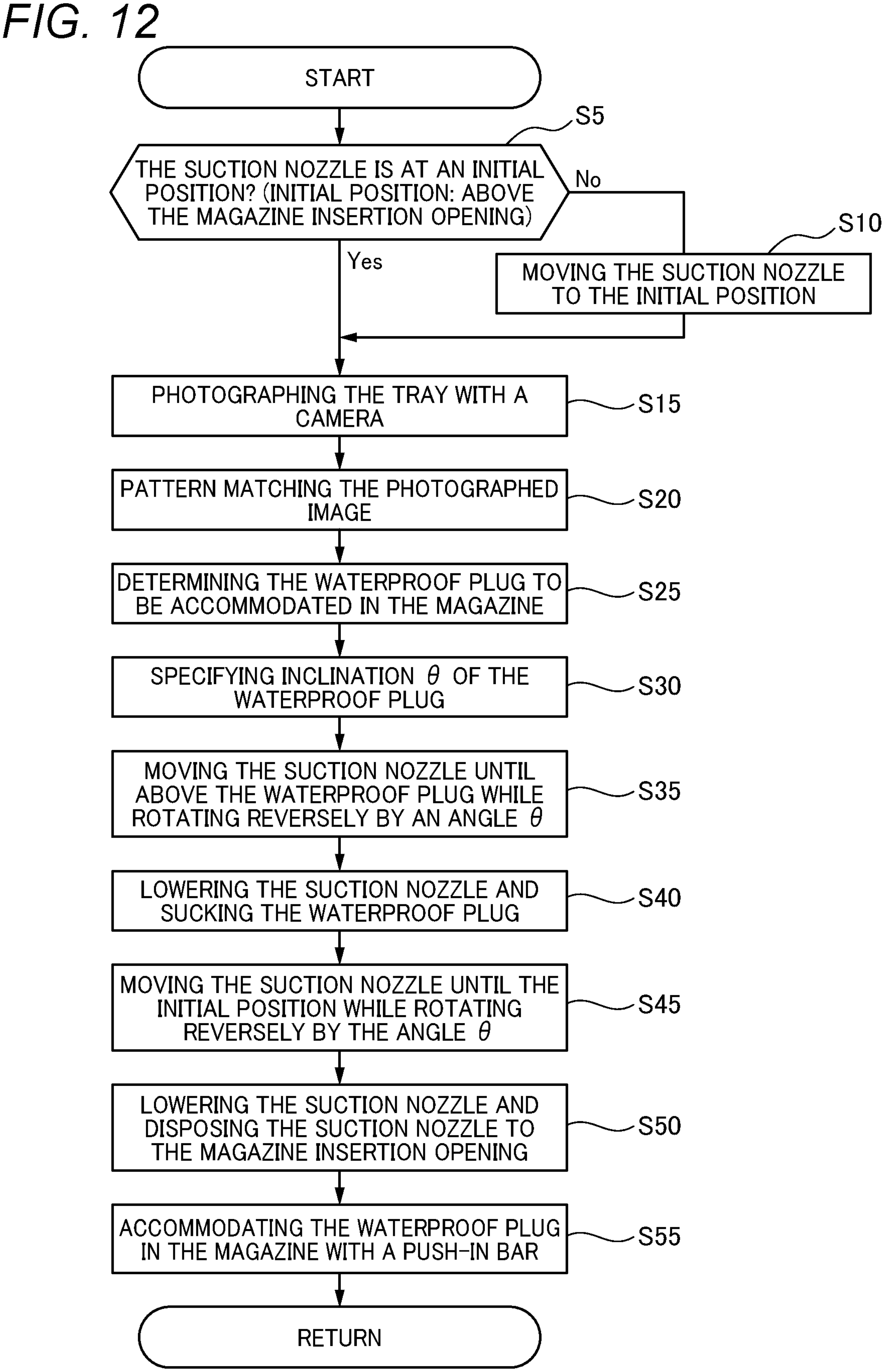
FIG. 12 is a flowchart illustrating a process when the waterproof plug supplier in FIG. 5 forms a waterproof plug magazine.

In the flowchart illustrated in FIG. 12, although the camera 31 photographs when the suction nozzle 68 is at the initial position, the driving unit 32 and the component moving unit 33 are not limited to being located outside the imaging range of the camera 31 (that is, the driving unit 32 and the component moving unit 33 do not interfere with the photographing), and the camera 31 may photograph when the suction nozzle 68 is located at a position other than the initial position. For example, in Step S45, the camera 31 (processing of Step S15) may photograph at a stage in which the suction nozzle 68 is returning to the initial position. Further, processing of Steps S20, S25, and S30 may be performed following the processing of Step S15 at the stage in which the suction nozzle 68 is returning to the initial position.

According to the wire harness manufacturing system SYS according to the embodiment of the present invention, the supply devices 200 (waterproof plug supplier 210 and housing supplier 220) can supply the components (waterproof plugs and housings) to the assembly line 100 via the component magazine (waterproof plug magazine and housing magazine). Further, the supply devices 200 (each of the supply devices 200) can prepare a plurality of types of component magazines different for each type of component. In other words, the supply devices 200 are not dedicated devices for each type of component, but general-purpose devices that can support various types of components. That is, the supply devices 200 and types of components are in a one-to-many relationship.

Therefore, as compared with the supply devices in the system described in the Background section, the number of devices can be reduced, and cost of the devices can be reduced. Further, since the component magazine can be used simply in accordance with the specification of the wire harness (without resetting the device), preparation cost of the assembly line 100 can also be reduced. In other words, by using the supply devices 200 and the component magazine, the assembly line 100 (and accordingly the entire manufacturing system SYS) can be flexibly adapted to wire harnesses having various specifications.

Therefore, the wire harness manufacturing system SYS according to the embodiment of the present invention can reduce the manufacturing cost as much as possible even when various types of components are to be supplied to the assembly line 100.

As another effect, according to the wire harness manufacturing system SYS according to the embodiment of the present invention, the supply devices 200 are indirectly connected to the assembly line 100 (via a component magazine). Therefore, as compared with a case where the supply devices and the assembly line are directly connected as in the supply devices in the system, operation can be continued even if one of the devices and the assembly line 100 malfunctions and operation thereof is stopped. In other words, the component magazine functions as a buffer of the entire system. Therefore, stability of the manufacturing system SYS can be improved.

All components of the wire harness do not have to be magazined. A component magazine may be utilized for a part of components (for example, waterproof plugs A to C, and housings A to D), and a device as the supply device in the system may be included separately from the above supply devices 200 for other components (for example, terminals, and clamps).

Further, in the wire harness manufacturing system SYS according to the embodiment of the present invention, the supply devices 200 can continue preparing waterproof plug magazines regardless of an operation state of the assembly line 100 (no matter the assembly line 100 is operating or stopped). This makes it possible to stock the component magazines during a period in which the assembly line 100 is stopped due to some problems, and to prepare a future demand for the component magazines. Therefore, stability of the manufacturing system SYS can be improved.

Further, in the wire harness manufacturing system SYS according to the embodiment of the present invention, the supply devices 200 can prepare the component magazines while associating the number of consumed specific components on the assembly line 100 per unit time and the number of manufactured component magazines in which the specific components are loaded per unit time. Accordingly, the component magazines can be manufactured in accordance with the actual number of consumed components. Therefore, the supply devices 200 are efficiently operated in consideration of a post-process (a series of assembly steps on the assembly line 100).

According to the wire harness manufacturing method according to the embodiment of the present invention, the supply devices 200 (waterproof plug supplier 210 and housing supplier 220) supply components (waterproof plugs and housings) to the assembly line 100 via the component magazine (waterproof plug magazine and housing magazine), and prepare a plurality of types of component magazines (210*a* to 210*c*, and 220*a* to 220*d*) for each type of component. In other words, the supply devices 200 are not dedicated devices different for each type of component (different for product No.), but general-purpose devices that can support various types (product No.) of components. That is, the supply devices 200 and the types (product No.) of components are in a one-to-many relationship via the component magazine.

Therefore, as compared with the manufacturing method in the system, the number of supply devices 200 can be reduced, so that installation cost of the supply devices 200 can be reduced. Further, since the component magazine can be used simply in accordance with the specification of the wire harness (for example, since the component magazine corresponding to the type (product No.) of the component can be simply attached to the supply devices), preparation cost of the manufacturing system SYS can be reduced without significantly resetting the supply devices 200. In other words, by using the component magazine, the assembly line 100 (and accordingly the entire manufacturing system SYS) can be flexibly adapted to various wire harnesses.

Therefore, the wire harness manufacturing method with such a configuration can reduce the manufacturing cost of the wire harness as much as possible even when various types of components are to be supplied to the assembly line 100.

As another effect, according to the wire harness manufacturing method with such a configuration, the supply devices 200 and the assembly line 100 are indirectly connected (via a component magazine). Therefore, unlike the case where both the supply devices 200 and the assembly line 100 are directly connected as in the manufacturing method in the system, operation can be continued even if one of the supply devices 200 and the assembly line 100 malfunctions and operation thereof is stopped. In other words, the component magazine functions as a buffer (buffer mechanism) of the entire system. Therefore, the wire harness manufacturing method of such a configuration can improve the stability of the entire system.

Other Embodiments

The present invention is not limited to the above embodiment, and various modifications can be adopted within the scope of the present invention. For example, the present invention is not limited to the above embodiment, but may be appropriately modified, improved or the like. Additionally, materials, shapes, sizes, numbers, arrangement places or the like of the components in the above embodiment are arbitrary and not limited as long as the present invention can be achieved.

Figure 15A:
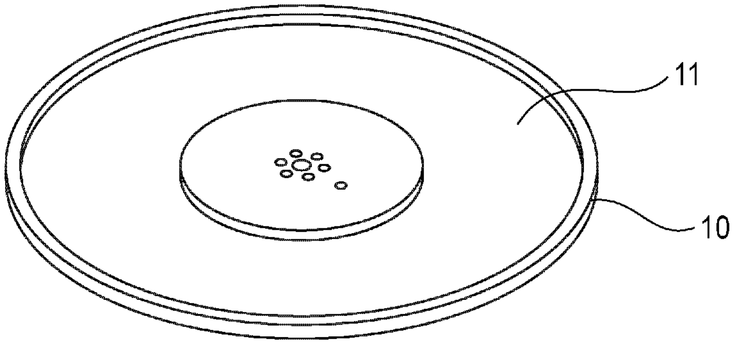
FIGS. 15A to 15C are perspective views illustrating modifications of the component tray.

For example, in the above embodiment, as illustrated in FIG. 8, by placing a corresponding type of waterproof plugs among a plurality of types of waterproof plugs in each of the plurality of grooves 11 formed in the upper surface of the component tray 10, the plurality of types of waterproof plugs are placed on the component tray 10 separately for each type of the waterproof plug U. However, as illustrated in FIG. 15A, one large groove 11 continuing in the circumferential direction may be formed in the component tray 10. In this case, the plurality of types of waterproof plugs may be placed on the component tray 10 separately for each type of the waterproof plug U by dividing the large groove 11 into a plurality of regions that are not continuous with each other and placing a corresponding type of waterproof plugs among a plurality of types of waterproof plugs in each of the plurality of regions in the upper surface of the component tray 10. Further, the plurality of types of waterproof plugs may be placed without dividing the large groove 11 into regions, and the types of the waterproof plugs may be identified by the pattern matching based on a photographed image of the camera 31.

Figure 15B:
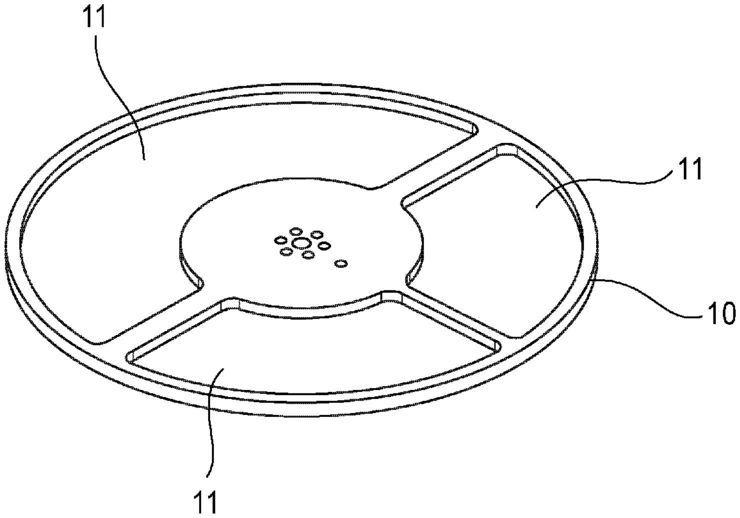
Figure 15C:
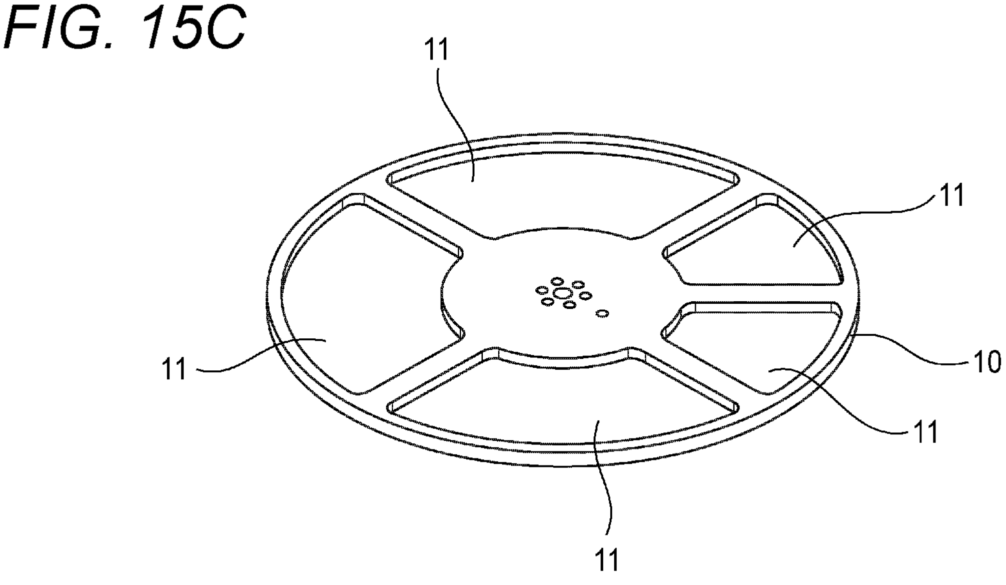

Further, in the above embodiment, as illustrated in FIG. 8, the plurality of grooves 11 having the same shape (the same area) are formed in the upper surface of the component tray 10, but as illustrated in FIGS. 15B and 15C, a plurality of grooves 11 having different shapes (different areas) may be formed on the upper surface of the component tray 10. Accordingly, when the number of manufactured waterproof plug magazines per unit time loaded with waterproof plugs U is different for each type of the waterproof plug U, the number of waterproof plugs U that can be accommodated in the grooves 11 and the number of manufactured waterproof plug magazines per unit time can be associated with each other for each type of waterproof plug U. In other words, the waterproof plugs can be placed on the component tray 10 in accordance with the number of consumed waterproof plugs.

Further, in the above embodiment, the wire harness manufacturing system SYS is provided with a plurality of supply devices 200 (specifically, waterproof plug supplier 210 and housing supplier 220) for the assembly line 100, but a single supply device 200 (specifically, waterproof plug supplier 210 or housing supplier 220) may be provided for the assembly line 100.

Figure 16:
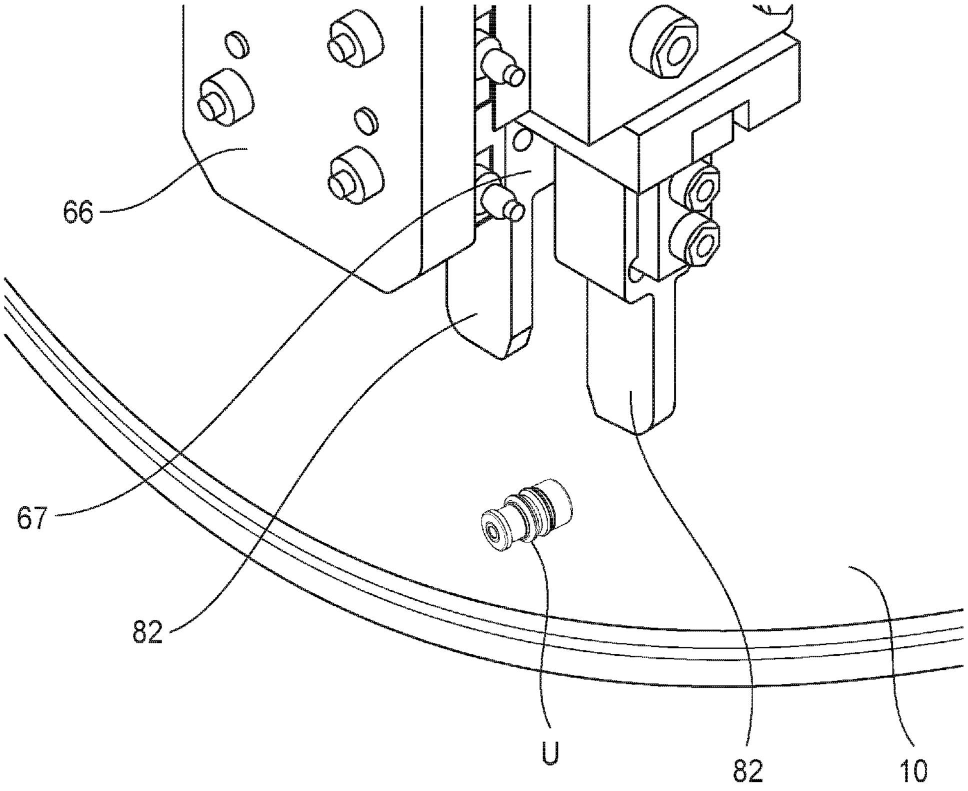
FIG. 16 is a perspective view illustrating a modification of a chuck.

Further, in the above embodiment, the bar-shaped suction nozzle 68 is used as a component chuck. However, as illustrated in FIG. 16, a pair of gripping arms 82 whose interval can be adjusted may be used as the component chuck.

Further, in the above embodiment, the driving unit 32 that moves the suction nozzle 68 along the x-y plane includes the first moving body 55, the second moving body 57, the first driving arm 58, and the second driving arm 59. However, any configuration may be adopted as the drive unit 32 as long as the suction nozzle 68 can be moved along the x-y plane.

Further, in the above embodiments, the waterproof plug magazines 210*a* to 210*c* and the housing magazines 220*a* to 220*d* are used as examples of the component magazine. However, in a case of components of a wire harness, a component magazine may be prepared by using a component other than the waterproof plug and the housing (for example, a clamp and a corrugated tube).

Here, characteristics of the embodiment of the wire harness manufacturing system and the wire harness manufacturing method according to the present invention is briefly summarized and listed in the following (1) to (5) respectively.

(1)

A wire harness manufacturing system (SYS) comprising:

an assembly line (100) that manufactures a wire harness and one or a plurality of supply devices (210) that prepares to supply component magazines (210*a* to 210*c*) in which components of the wire harness (waterproof plugs A to C) are loaded in a holder (20) to the assembly line, wherein each of the supply devices (210) is capable of preparing a plurality of the component magazines (210*a* to 210*c*) which are different according to types of the components (waterproof plugs A to C), wherein the component magazines (210*a* to 210*c*) are capable of delivering from the supply devices to at least a part of the series of assembly steps in a state of being independent of both the assembly line (100) and the supply device (210), wherein the supply devices (210) comprises:

- a component tray (10) on which the components are mounted;
- the holder (20);
- a transport mechanism (30) that transports the components (waterproof plugs A to C) from the component tray to a loading port (76) of the holder; and a loading mechanism (40) that loading the components disposed in the loading port into the holder and forms the component magazines (210*a* to 210*c*), wherein the component tray (10) is capable of mounting the components thereon separately according to types of the components (waterproof plugs A to C), and wherein the transport mechanism (30) comprises:

a camera (31) that photographs the components placed on the component tray;

a drive unit (32) that is capable of moving a movable body along a movable plane defined by a first direction connecting the component tray (10) to the loading port (76) and a second direction intersecting the first direction; and a component moving unit (33) that is supported by the moving body and includes a component chuck (68) movable in a third direction intersecting the moving plane and is capable of holding or releasing the components, and a motor (65) that rotates the component chuck (68) in the moving plane, and wherein the drive unit transports the components from the component tray (10) to the loading port (76) based on an image photographed by the camera (31), so that the components (waterproof plugs A to C) disposed in the loading port are aligned in a predetermined direction.

(2)

The wire harness manufacturing system according to the above (1), wherein the supply devices (210) continues to prepare the component magazines (210*a* to 210*c*) regardless of an operating state of the assembly line (100).

(3)

The wire harness manufacturing system according to the above (1) or (2), wherein the supply devices (210) prepare the component magazines, corresponding associating a consumption number of specific components (waterproof plugs A to C) on the assembly line per unit time to a manufacturing number of the component magazines (210*a* to 210*c*) per unit time loaded with the specific components (waterproof plugs A to C).

(4)

A wire harness manufacturing system (SYS) comprising:

an assembly line (100) that manufactures a wire harness and one or a plurality of supply devices (210) that prepares to supply component magazines (210*a* to 210*c*) in which components of the wire harness (waterproof plugs A to C) are loaded in a holder (20) to the assembly line, wherein each of the supply devices (210) is capable of preparing a plurality of the component magazines (210*a* to 210*c*) which are different according to types of the components (waterproof plugs A to C), wherein the component magazines (210*a* to 210*c*) are capable of delivering from the supply devices to at least a part of the series of assembly steps in a state of being independent of both the assembly line (100) and the supply device (210), wherein the supply devices (210) comprises:

a component tray (10) on which the components are mounted;

the holder (20);

a transport mechanism (30) that transports the components (waterproof plugs A to C) from the component tray to a loading port (76) of the holder; and a loading mechanism (40) that loading the components disposed in the loading port into the holder and forms the component magazines (210*a* to 210*c*), wherein the component tray (10) is capable of mounting the components thereon separately according to types of the components (waterproof plugs A to C), and wherein the transport mechanism (30) comprises:

a camera (31) that photographs the components placed on the component tray;

a drive unit (32) that includes a first moving body (55) that is movable with being constrained by a first rail (54) extending in a first direction connecting the component tray (10) to the loading port (76), a second moving body (57) that is movable while being constrained by a second rail (56) provided on the first moving body (55) so as to extend in a second direction intersecting the first direction, and drive arms (58, 59) that apply a driving force in at least one of the first direction and the second direction to the second moving body (57), and that is capable of moving the second movable body (57) along a movable plane defined by the first direction and the second direction; and a component moving unit (33) that is supported by the second moving body (57) and includes a component chuck (68) movable in a third direction intersecting the moving plane and is capable of holding or releasing the components, and a motor (65) that rotates the component chuck (68) in the moving plane, and wherein the drive unit transports the components from the component tray (10) to the loading port (76) based on an image photographed by the camera (31), so that the components (waterproof plugs A to C) disposed in the loading port are aligned in a predetermined direction.

(5)

A wire harness manufacturing method using one or a plurality of supply devices (210) that prepare to supply component magazines (210*a* to 210*c*) in which components (waterproof plugs A to C) of a wire harness are loaded in a holder (20) to an assembly line (100) of the wire harness, the wire harness manufacturing method comprising:

preparing a plurality of the component magazines (210*a* to 210*c*) which are different according to types of the components (waterproof plugs A to C) in each of the supply devices (210);

delivering the component magazines (210*a* to 210*c*) from the supply devices to at least a part of the assembly line in a state of being independent of both the assembly line (100) and the supply device (210); and using the components (waterproof plugs A to C) picked up from the component magazines on the assembly line (100) for manufacturing the wire harness, wherein the supply devices (210) comprises:

a component tray (10) on which the components are mounted;

the holder (20);

a transport mechanism (30) that transports the components (waterproof plugs A to C) from the component tray to a loading port (76) of the holder; and a loading mechanism (40) that loading the components disposed in the loading port into the holder and forms the component magazines (210*a* to 210*c*), wherein the component tray (10) is capable of mounting the components thereon separately according to types of the components (waterproof plugs A to C), and wherein the transport mechanism (30) comprises:

a camera (31) that photographs the components placed on the component tray;

a drive unit (32) that is capable of moving a movable body along a movable plane defined by a first direction connecting the component tray (10) to the loading port (76) and a second direction intersecting the first direction; and a component moving unit (33) that is supported by the moving body and includes a component chuck (68) movable in a third direction intersecting the moving plane and is capable of holding or releasing the components, and a motor (65) that rotates the component chuck (68) in the moving plane, and wherein the drive unit transports the components from the component tray (10) to the loading port (76) based on an image photographed by the camera (31), so that the components (waterproof plugs A to C) disposed in the loading port are aligned in a predetermined direction.

The present application is based on a Japanese Patent Application (JP-A-2016-109040) filed on May 31, 2016, contents of which are incorporated herein as reference.

INDUSTRIAL APPLICABILITY

According to the wire harness manufacturing system and the wire harness manufacturing method of the present invention, the manufacturing cost of the wire harness can be reduced as much as possible even when various types of components are to be supplied to the assembly line. The present invention having this effect is useful for a wire harness manufacturing system and a wire harness manufacturing method.

DESCRIPTION OF REFERENCE NUMERALS

10 component tray
11 groove
20 holder
30 transport mechanism
31 camera
32 drive unit
33 component moving unit
40 loading mechanism
54 first rail
55 first moving body
56 second rail
57 second moving body
58 first drive arm (drive arm)
59 second drive arm (drive arm)
65 electric motor (motor)
68 suction nozzle (component chuck)
76 groove (loading port)
100 assembly line
200 supply device
210 waterproof plug supplier (supply device)
210*a* to 210*c* waterproof plug magazine (component magazine)
U waterproof plug
SYS wire harness manufacturing system

What is claimed is:

1. A wire harness manufacturing system comprising:

an assembly line that manufactures a wire harness and one or a plurality of supply devices that prepares to supply component magazines in which components of the wire harness are loaded in a holder to the assembly line, wherein each of the supply devices is capable of preparing a plurality of the component magazines which are different according to types of the components, wherein the component magazines are capable of delivering from the supply devices to at least a part of series of assembly steps in a state of being independent of both the assembly line and the supply device, wherein each of the supply devices comprises:

a component tray on which the components are mounted;

the holder;

a transport mechanism that transports the components from the component tray to a loading port of the holder; and a loading mechanism that loading the components disposed in the loading port into the holder and forms the component magazines, wherein the component tray is capable of mounting the components thereon separately according to types of the components, and wherein the transport mechanism comprises:

a camera that photographs the components placed on the component tray;

a drive unit that is capable of moving a movable body along a movable plane defined by a first direction connecting the component tray to the loading port and a second direction intersecting the first direction; and a component moving unit that is supported by the movable body and includes a component chuck movable in a third direction intersecting the movable plane and is capable of holding or releasing the components, and a motor that rotates the component chuck in the movable plane, and wherein the drive unit transports the components from the component tray to the loading port based on an image photographed by the camera so that the components disposed in the loading port are aligned in a predetermined direction.

2. The wire harness manufacturing system according to claim 1, wherein the supply devices continues to prepare the component magazines regardless of an operating state of the assembly line.

3. The wire harness manufacturing system according to claim 1, wherein the supply devices prepare the component magazines, corresponding associating a consumption number of specific components on the assembly line per unit time to a manufacturing number of the component magazines per unit time loaded with the specific components.

4. The wire harness manufacturing system comprising:

an assembly line that manufactures a wire harness and one or a plurality of supply devices that prepares to supply component magazines in which components of the wire harness are loaded in a holder to the assembly line, wherein each of the supply devices is capable of preparing a plurality of the component magazines which are different according to types of the components, wherein the component magazines are capable of delivering from the supply devices to at least a part of series of assembly steps in a state of being independent of both the assembly line and the supply device, wherein each of the supply devices comprises:

a component tray on which the components are mounted;

the holder;

a transport mechanism that transports the components from the component tray to a loading port of the holder; and a loading mechanism that loading the components disposed in the loading port into the holder and forms the component magazines, wherein the component tray is capable of mounting the components thereon separately according to types of the components, and wherein the transport mechanism comprises:

a camera that photographs the components placed on the component tray;

a drive unit that includes a first moving body that is movable with being constrained by a first rail extending in a first direction connecting the component tray to the loading port, a second moving body that is movable while being constrained by a second rail provided on the first moving body so as to extend in a second direction intersecting the first direction, and drive arms that apply a driving force in at least one of the first direction and the second direction to the second moving body and that is capable of moving the second movable body along a movable plane defined by the first direction and the second direction; and a component moving unit that is supported by the second moving body and includes a component chuck movable in a third direction intersecting the movable plane and is capable of holding or releasing the components, and a motor that rotates the component chuck in the movable plane, and wherein the drive unit transports the components from the component tray to the loading port based on an image photographed by the camera so that the components disposed in the loading port are aligned in a predetermined direction.

5. A wire harness manufacturing method using one or a plurality of supply devices that prepare to supply component magazines in which components of a wire harness are loaded in a holder to an assembly line of the wire harness, the wire harness manufacturing method comprising:

preparing a plurality of the component magazines which are different according to types of the components in each of the supply devices;

delivering the component magazines from the supply devices to at least a part of the assembly line in a state of being independent of both the assembly line and the supply device; and using the components picked up from the component magazines on the assembly line for manufacturing the wire harness, wherein each of the supply devices comprises:

a component tray on which the components are mounted;

the holder;

a transport mechanism that transports the components from the component tray to a loading port of the holder; and a loading mechanism that loading the components disposed in the loading port into the holder and forms the component magazines, wherein the component tray is capable of mounting the components thereon separately according to types of the components, and wherein the transport mechanism comprises;

a camera that photographs the components placed on the component tray;

a drive unit that is capable of moving a movable body along a movable plane defined by a first direction connecting the component tray to the loading port and a second direction intersecting the first direction; and a component moving unit that is supported by the movable body and includes a component chuck movable in a third direction intersecting the movable plane and is capable of holding or releasing the components, and a motor that rotates the component chuck in the movable plane, and wherein the drive unit transports the components from the component tray to the loading port based on an image photographed by the camera so that the components disposed in the loading port are aligned in a predetermined direction.

* * * * *